United States Patent
Kim et al.

(10) Patent No.: US 11,055,216 B2
(45) Date of Patent: Jul. 6, 2021

(54) CONTROLLER AND OPERATING METHOD THEREOF

(71) Applicant: SK hynix Inc., Gyeonggi-do (KR)

(72) Inventors: Se Hyun Kim, Seoul (KR); Hui Jae Yu, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 16/522,271

(22) Filed: Jul. 25, 2019

(65) Prior Publication Data
US 2020/0192793 A1 Jun. 18, 2020

(30) Foreign Application Priority Data
Dec. 14, 2018 (KR) .......... 10-2018-0161950

(51) Int. Cl.
*G06F 12/02* (2006.01)
*G06F 3/06* (2006.01)

(52) U.S. Cl.
CPC ........ *G06F 12/0261* (2013.01); *G06F 3/0659* (2013.01); *G06F 3/0679* (2013.01); *G06F 12/0246* (2013.01); *G06F 2212/7205* (2013.01); *G06F 2212/7209* (2013.01)

(58) Field of Classification Search
CPC .. G06F 3/0659; G06F 3/0679; G06F 12/0246; G06F 12/0261; G06F 2212/7205; G06F 2212/7209
See application file for complete search history.

(56) References Cited

U.S. PATENT DOCUMENTS

| | | | | |
|---|---|---|---|---|
| 2014/0047210 | A1* | 2/2014 | Cohen | G06F 12/0246 711/202 |
| 2015/0347295 | A1* | 12/2015 | Ihm | G06F 12/0246 711/103 |
| 2019/0004731 | A1* | 1/2019 | Mainali | G06F 12/0238 |

FOREIGN PATENT DOCUMENTS

| | | |
|---|---|---|
| KR | 10-2016-0044989 | 4/2016 |
| KR | 10-2016-0068108 | 6/2016 |

* cited by examiner

*Primary Examiner* — Larry T Mackall
(74) *Attorney, Agent, or Firm* — IP & T Group LLP

(57) ABSTRACT

A controller controls an operation of a semiconductor memory device. The controller includes a request analyzer, a storage, and a garbage collection controller. The request analyzer generates invalid data information, based on an erase request received from a host. The storage stores a garbage collection reference table representing memory blocks excluded from selection as a victim block on which a garbage collection operation is to be performed, based on the invalid data information. The garbage collection controller controls the garbage collection operation on the semiconductor memory device, based on exclusion block information generated according to the garbage collection reference table.

11 Claims, 17 Drawing Sheets

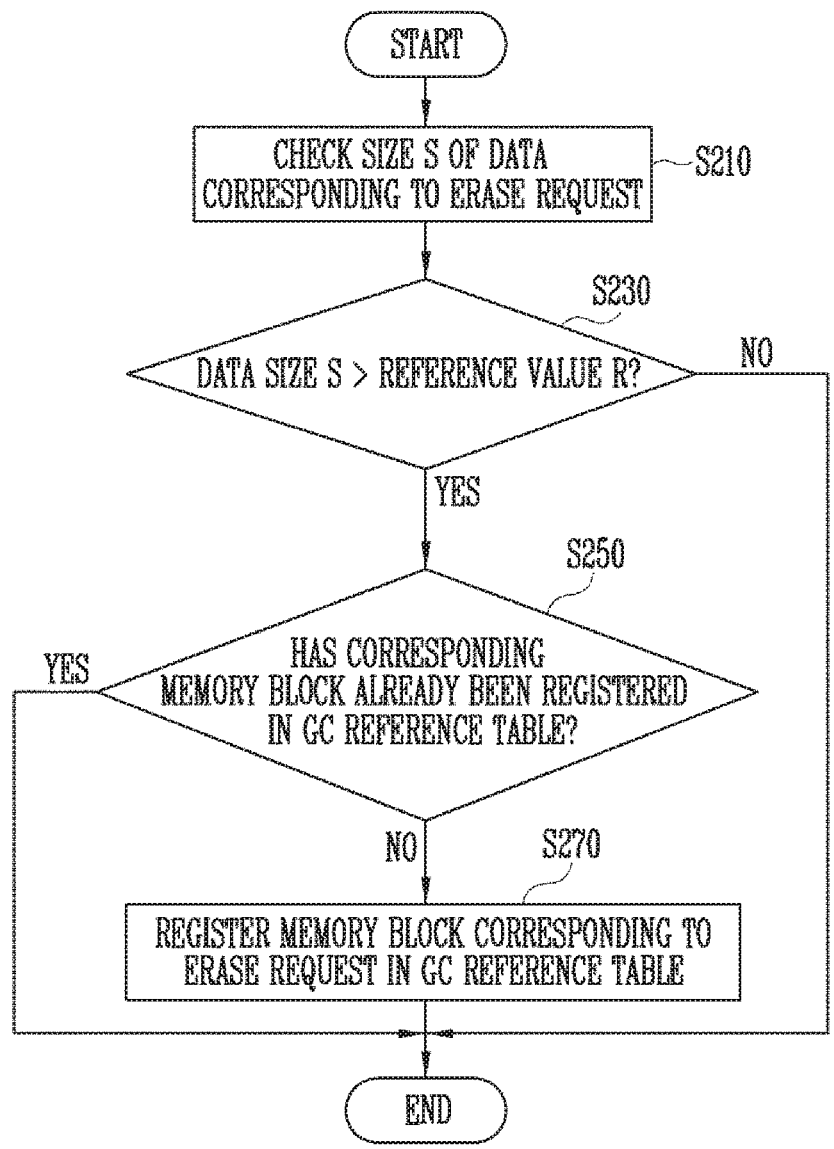

Invalidated Data Size (S) ≤ Reference Value (R)

Invalidated Data Size (S) > Reference Value (R)

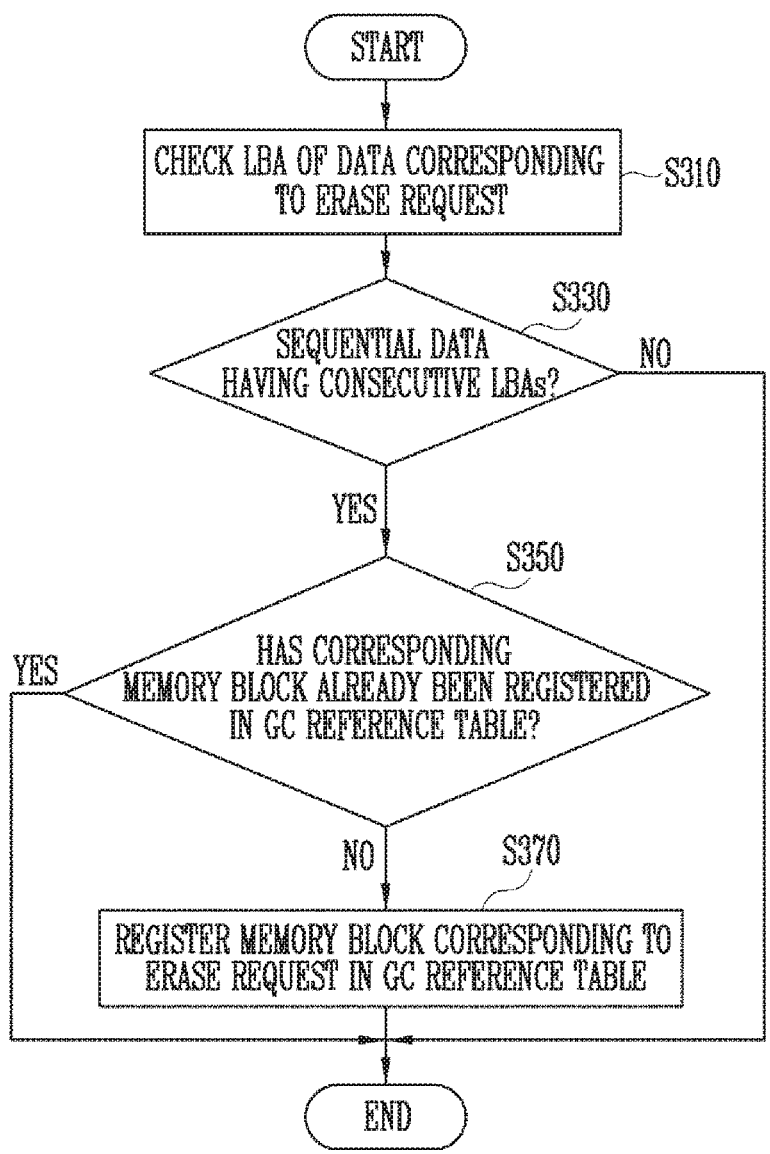

CONTROLLER AND OPERATING METHOD THEREOF

CROSS-REFERENCE TO RELATED APPLICATION

The present application claims priority under 35 U.S.C. § 119(a) to Korean patent application number 10-2018-0161950, filed on Dec. 14, 2018, the entire disclosure of which is incorporated herein by reference in its entirety.

BACKGROUND

Field of Invention

The present disclosure generally relates to an electronic device, and more particularly, to a controller for controlling an operation of a semiconductor memory device and an operating method of the controller.

Description of Related Art

Semiconductor memory devices may be formed in a two-dimensional structure in which strings are arranged horizontally to a semiconductor substrate, or be formed in a three-dimensional structure in which strings are arranged vertically to a semiconductor substrate. A three-dimensional semiconductor memory device was devised so as to overcome the limit of degree of integration in two-dimensional semiconductor memory devices, and may include a plurality of memory cells vertically stacked on a semiconductor substrate.

A controller may control an operation of the semiconductor memory device.

SUMMARY

Embodiments provide a controller capable of efficiently performing a garbage collection operation.

Embodiments also provide an operating method of a controller capable of efficiently performing a garbage collection operation.

In accordance with an aspect of the present disclosure, there is provided a controller for controlling an operation of a semiconductor memory device, the controller including: a request analyzer configured to generate invalid data information, based on an erase request received from a host; a storage configured to store a garbage collection reference table representing memory blocks excluded from selection as a victim block on which a garbage collection operation is to be performed, based on the invalid data information; and a garbage collection controller configured to control the garbage collection operation on the semiconductor memory device, based on exclusion block information generated according to the garbage collection reference table.

The storage may check a size of data corresponding to the erase request, and determine that a memory block in which the data is stored is to be excluded from selection as the victim block, when the size of the data is greater than a reference value.

The storage may update the garbage collection reference table such that the memory block is included in the garbage collection reference table.

When the garbage collection operation is started, the garbage collection controller may check a size of each invalid page in memory blocks included in the semiconductor memory device. The garbage collection controller may determine, as the victim block, a memory block that is not registered in the garbage collection reference table among memory blocks having an invalid page size greater than a threshold value, based on the exclusion block information.

The controller may further include a command generator configured to generate a command for controlling an operation of the semiconductor memory device.

The garbage collection controller may generate garbage collection information including information on selected victim blocks. The command generator may generate a command for performing the garbage collection operation, based on the garbage collection information, and transfer the generated commands to the semiconductor memory device.

The request analyzer may generate a command generation control signal for controlling an operation of the semiconductor memory device in response to a request received from the host. The command generator may generate the command, based on the command generation control signal.

In accordance with another aspect of the present disclosure, there is provided a method for operating a controller for controlling an operation of a semiconductor memory device, the method including: receiving an erase request from a host; invalidating a physical page of a memory block corresponding to the erase request; and updating a garbage collection reference table representing memory blocks excluded from selection as a victim block on which a garbage collection operation is to be performed, based on the erase request.

The updating of the garbage collection reference table may include: checking a size of data corresponding to the erase request; comparing the size of the data with a reference value; and registering a memory block corresponding to the erase request in the garbage collection reference table, based on the comparison result.

The registering of the memory block corresponding to the erase request in the garbage collection reference table, based on the comparison result, may include: when the comparison indicates that the size of the data is larger than the reference value, determining whether the memory block has been registered in the garbage collection reference table; and when it is determined that the memory block is not registered in the garbage collection reference table, registering the memory block in the garbage collection reference table.

The updating of the garbage collection reference table may include: checking a logical block address of the data corresponding to the erase request; when it is determined that the logical block address represents consecutive addresses, determining whether the memory block has been registered in the garbage collection reference table; and when it is determined that the memory block is not registered in the garbage collection reference table, registering the memory block in the garbage collection reference table.

The updating of the garbage collection reference table may include: checking a size and a logical block address of the data corresponding to the erase request; when it is determined that the logical block address represents consecutive addresses, comparing the size of the data with a reference value; and registering a memory block corresponding to the erase request in the garbage collection reference table, based on the comparison result.

The registering of the memory block corresponding to the erase request in the garbage collection reference table, based on the comparison result, may include: when the comparison indicates that the size of the data is larger than the reference value, determining whether the memory block has been registered in the garbage collection reference table; and when it is determined that the memory block is not registered in the garbage collection reference table, registering the memory block in the garbage collection reference table.

In accordance with still another aspect of the present disclosure, there is provided a method for operating a controller for controlling an operation of a semiconductor memory device, the method including: determining victim blocks on which a garbage collection operation is to be performed, based on a garbage collection reference table; copying data of valid pages included in the victim blocks to a free block; and invalidating the valid pages included in the victim blocks.

The determining of the victim blocks on which the garbage collection operation is to be performed, based on the garbage collection reference table, may include: checking a size of each invalid page included in memory blocks; identifying memory blocks each having an invalid page size greater than a threshold value among the memory blocks; and determining, as a victim block, at least one of the memory blocks not registered in the garbage collection reference table among the checked memory blocks.

The garbage collection reference table may be updated based on an erase request from a host.

When a size of data corresponding to the erase request is greater than a reference value, a memory block corresponding to the erase request may be registered in the garbage collection reference table.

BRIEF DESCRIPTION OF THE DRAWINGS

Various embodiments are described more fully below with reference to the accompanying drawings; however, the present invention may be embodied in different forms and should not be construed as limited to the embodiments set forth herein. Rather, these embodiments are provided so that this disclosure is thorough and complete and fully conveys the scope of the embodiments to those skilled in the art. Throughout the specification, reference to "an embodiment," "another embodiment" or the like is not necessarily to only one embodiment, and different references to any such phrase are not necessarily to the same embodiment(s).

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

FIG. 9 is a flowchart illustrating an operation of updating a garbage collection reference table in accordance with an embodiment of the present disclosure.

FIG. 12 is a flowchart illustrating an operation of updating a garbage collection reference table in accordance with an embodiment of the present disclosure.

DETAILED DESCRIPTION

Figure 1:
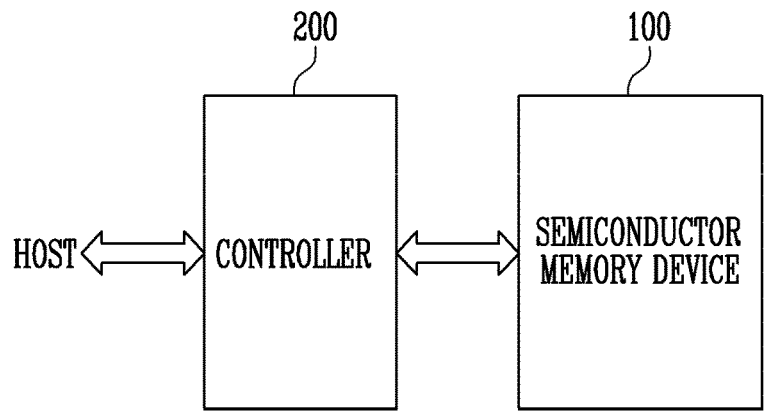
FIG. 1 is a block diagram illustrating a memory system in accordance with an embodiment of the present disclosure.

In the present disclosure, advantages, features and methods for achieving them will become more apparent after a reading of the following embodiments taken in conjunction with the drawings. The present disclosure may, however, be embodied in different forms and should not be construed as being limited to the embodiments set forth herein. Rather, these embodiments are provided to describe the present disclosure in detail to the extent that those skilled in the art to which the disclosure pertains may easily practice the present invention.

In the entire specification, when an element is referred to as being "connected" or "coupled" to another element, it can be directly connected or coupled to the another element or be indirectly connected or coupled to the another element with one or more intervening elements interposed therebetween. In addition, when an element is referred to as "including" a component, this indicates that the element may further include one or more other components, instead of excluding such other component(s), unless the context indicates otherwise.

Various embodiments of the present disclosure are described in detail below with reference to the accompanying drawings. The same reference numerals are used to designate the same elements as those shown in other drawings. Description of well-known techniques may be omitted so as to not obscure important concepts of the embodiments.

FIG. 1 is a block diagram illustrating a memory system 1000 in accordance with an embodiment of the present disclosure.

Referring to FIG. 1, the memory system 1000 includes a semiconductor memory device 100 and a controller 200.

The semiconductor memory device 100 operates under the control of the controller 200. More specifically, the semiconductor memory device 100 writes data in a memory cell array in response to a write request from the controller 200. When a write command, an address, and data are received as the write request from the controller 200, the semiconductor memory device 100 writes the data in the memory cells indicated by the address.

The semiconductor memory device 100 performs a read operation in response to a read request from the controller 200. When a read command and an address are received as the read request from the controller 200, the semiconductor memory device 100 reads data of memory cells indicated by the address, and outputs the read data to the controller 200.

The semiconductor memory device 100 may be implemented with a NAND flash memory, a vertical NAND flash memory, a NOR flash memory, a Resistive Random Access Memory (RRAM), a Phase-Change Random Access Memory (PRAM), a Magnetoresistive Random Access Memory (MRAM), a Ferroelectric Random Access Memory (FRAM), or a Spin Transfer Torque Random Access Memory (SU-RAM). Also, the semiconductor memory device 100 may be implemented in a three-dimensional array structure. The present disclosure may be applied to not only a flash memory device in which a charge storage layer is configured with a conductive floating gate but also a Charge Trap Flash (CTF) in which a charge storage layer is configured with an insulating layer.

The controller 200 is coupled between the semiconductor memory device 100 and a host (HOST). The controller 200 interfaces between the host and the semiconductor memory device 100. The controller 200 may transmit a write request or read request to the semiconductor memory device 100 under the control of the host.

The controller 200 performs a garbage collection operation for increasing the storage capacity of the semiconductor memory device 100. That is, the controller 200 performs the garbage collection operation by selecting a memory block having an amount of invalid data greater than or equal to a reference amount, copying valid data of the corresponding selected memory block to another memory block, i.e., a free block in which no data is stored, and erasing the corresponding selected memory block including only the invalid data. The erased memory block is a free block, and can secure a data storage space corresponding to the storage capacity of the erased memory block.

In a specific case, e.g., under a situation in which a request for erasing a large amount of data is received from the host, an unnecessary garbage collection operation may be performed. In general, when the garbage collection operation is performed, a memory block having the smallest amount of valid data, i.e., a memory block having the largest amount of invalid data, is selected as a victim block. In a specific situation, e.g., when a large file is repeatedly stored and erased in a test environment of the host, there may occur a situation in which all valid data of a specific memory block is invalidated at once under and a portion of the valid data of the corresponding memory block remains. When the garbage collection operation is performed when a portion of the valid data remains, valid data copied to a new memory block, i.e., a target block may be invalidated at once, which is inefficient. Under the above situation, all data of the corresponding memory block may be invalidated at once even when the garbage collection operation is not performed. Hence, the corresponding memory block may be excluded from the victim block of the garbage collection operation, which is advantageous in terms of the lifespan of the memory device.

In various embodiments, when an erase request for data of a specific amount or more is received from the host, a memory block storing the corresponding data is excluded from the victim block of the garbage collection operation.

In various embodiments, when an erase request for consecutive Logical Block Addresses (LBAs) is received from the host, a memory block storing corresponding data is excluded from the victim block of the garbage collection operation.

Accordingly, a memory block for which it is expected that all data will be invalidated at once is excluded from the victim block of the garbage collection operation, so that the garbage collection operation is not performed. Consequently, in various embodiments, the efficiency of the garbage collection operation is improved, and the Wear Acceleration Index (WAI) of the semiconductor memory device is lowered. Thus, the performance and lifespan of the semiconductor memory device may be enhanced.

Figure 2:
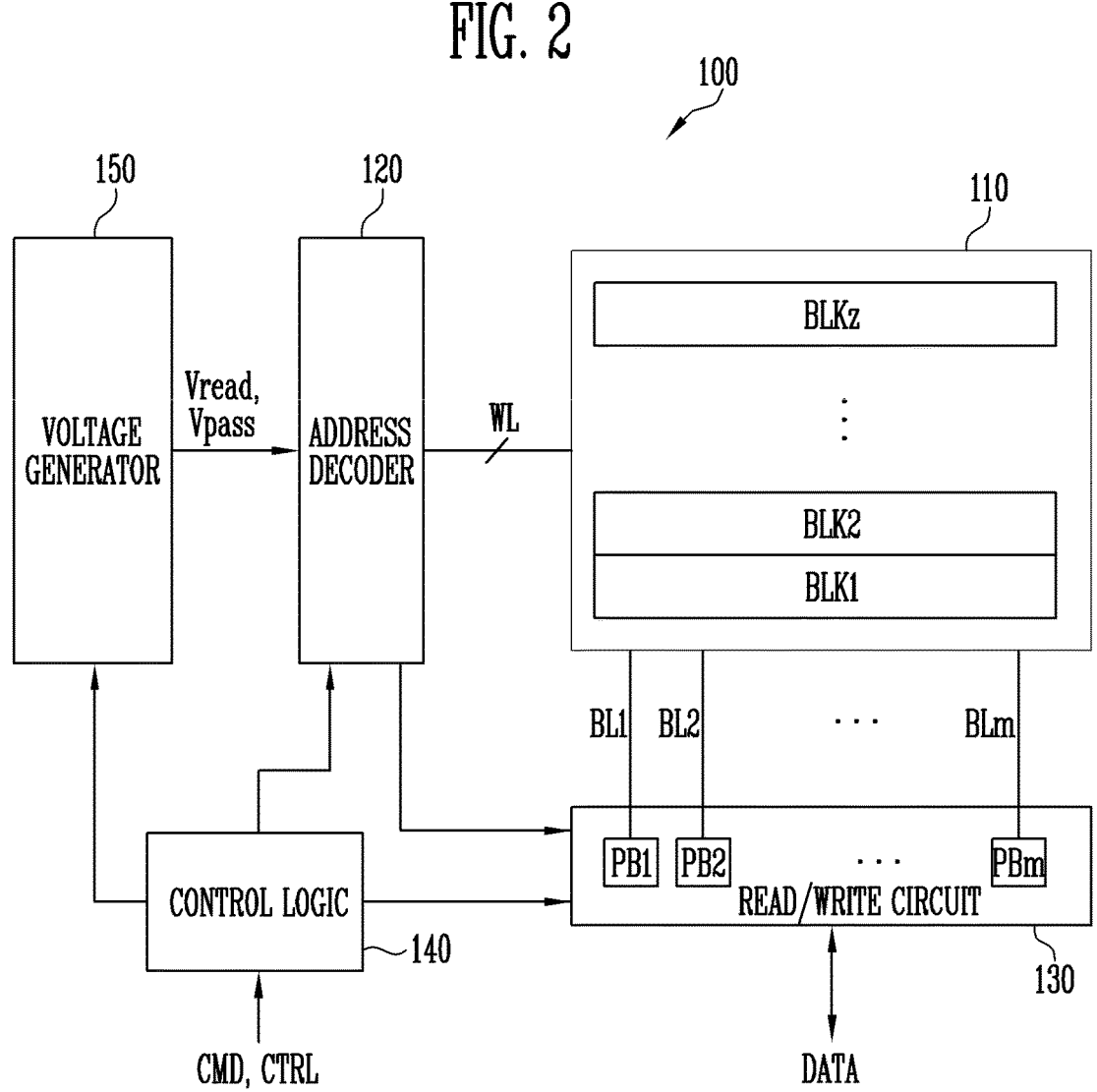
FIG. 2 is a block diagram illustrating a semiconductor memory device in accordance with an embodiment of the present disclosure.

FIG. 2 is a block diagram illustrating a semiconductor memory device, e.g., the semiconductor memory device 100 shown in FIG. 1, in accordance with an embodiment of the present disclosure.

Referring to FIG. 2, the semiconductor memory device 100 includes a memory cell array 110, an address decoder 120, a read and write (read/write) circuit 130, control logic 140, and a voltage generator 150.

The memory cell array 110 includes a plurality of memory blocks BLK1 to BLKz. The plurality of memory blocks BLK1 to BLKz are coupled to the address decoder 120 through word lines WL. The plurality of memory blocks BLK1 to BLKz are coupled to the read/write circuit 130 through bit lines BL1 to BLm. Each of the plurality of memory blocks BLK1 to BLKz includes a plurality of memory cells. In an embodiment, the plurality of memory cells are nonvolatile memory cells, and may be configured as nonvolatile memory cells having a vertical channel structure. The memory cell array 110 may be configured as a memory cell array having a two-dimensional structure. In some embodiments, the memory cell array 110 may be configured as a memory cell array having a three-dimensional structure. Each of the plurality of memory cells in the memory cell array 110 may store data of at least one bit. In an embodiment, each of the plurality of memory cells in the memory cell array 110 may be a single-level cell (SLC) that stores data of one bit. In another embodiment, each of the plurality of memory cells in the memory cell array 110 may be a multi-level cell (MLC) that stores data of two bits. In still another embodiment, each of the plurality of memory cells in the memory cell array 110 may be a triple-level cell (TLC) that stores data of three bits. In still another embodiment, each of the plurality of memory cells in the memory cell array 110 may be a quad-level cell (QLC) that stores data of four bits. In some embodiments, the memory cell array 110 may include a plurality of memory cells that each stores data of five or more bits.

The address decoder 120, the read/write circuit 130 and the voltage generator 150 operate as a peripheral circuit that drives the memory cell array 110. The address decoder 120 is coupled to the memory cell array 110 through the word lines WL. The address decoder 120 operates under the control of the control logic 140. The address decoder 120 receives an address through an input/output buffer (not shown) provided in the semiconductor memory device 100.

The address decoder 120 decodes a block address in the received address. The address decoder 120 selects at least one memory block according to the decoded block address. In a read voltage application operation during a read operation, the address decoder 120 applies a read voltage Vread generated by the voltage generator 150 to a selected word line among the selected memory blocks, and applies a pass voltage Vpass to unselected word lines. In a program verify operation, the address decoder 120 applies a verify voltage generated by the voltage generator 150 to the selected word line among the selected memory blocks, and applies the pass voltage Vpass to unselected word lines.

The address decoder 120 decodes a column address in the received address. The address decoder 12 transmits the decoded column address to the read/write circuit 130.

Read and program operations of the semiconductor memory device 100 are performed in units of pages. An address received in a request of the read operation and the program operation includes a block address, a row address, and a column address. The address decoder 120 selects one memory block and one word line according to the block address and the row address. The column address is decoded by the address decoder 120 to be provided to the read/write circuit 130.

The address decoder 120 may include a block decoder, a row decoder, a column decoder, and an address buffer.

The read/write circuit 130 includes a plurality of page buffers PB1 to PBm. The read/write circuit 130 may operate as a "read circuit" in a read operation of the memory cell array 110, and operate as a "write circuit" in a write operation of the memory cell array 110. The plurality of page buffers PB1 to PBm are connected to the memory cell array 110 through the bit lines BL1 to BLm. In order to sense threshold voltages of memory cells in the read operation and the program verify operation, the plurality of page buffers PB1 to PBm sense a change in amount of current flowing depending on a program state of a corresponding memory cell while continuously supplying sensing current to bit lines connected to the memory cells, and latch the sensed change as sensing data. The read/write circuit 130 operates in response to page buffer control signals output from the control logic 140.

In the read operation, the read/write circuit 130 senses data of a memory cell, temporarily stores read data and then outputs data DATA to the input/output buffer (not shown) of the semiconductor memory device 100. In an embodiment, the read/write circuit 130 may include a column selection circuit, in addition to the page buffers (or page registers).

The control logic 140 is connected to the address decoder 120, the read/write circuit 130, and the voltage generator 150. The control logic 140 receives a command CMD and a control signal CTRL through the input/output buffer (not shown) of the semiconductor memory device 100. The control logic 140 is configured to control overall operations of the semiconductor memory device 100 in response to the control signal CTRL. Also, the control logic 140 outputs a control signal for controlling sensing node precharge potential levels of the plurality of page buffers PB1 to PBm. The control logic 140 may control the read/write circuit 130 to perform the read operation of the memory cell array 110.

In the read operation, the voltage generator 150 generates the read voltage Vread and the pass voltage Vpass in response to a control signal output from the control logic 140. In order to generate a plurality of voltages having various voltage levels, the voltage generator 150 may include a plurality of pumping capacitors for receiving an internal power voltage, and generate a plurality of voltages by selectively activating the plurality of pumping capacitors under the control of the control logic 140.

The address decoder 120, the read/write circuit 130, and the voltage generator 150 may serve as a "peripheral circuit" that performs a read operation, a write operation, and an erase operation on the memory cell array 110. The peripheral circuit performs the read operation, the write operation, and the erase operation on the memory cell array 110 under the control of the control logic 140.

Figure 3:
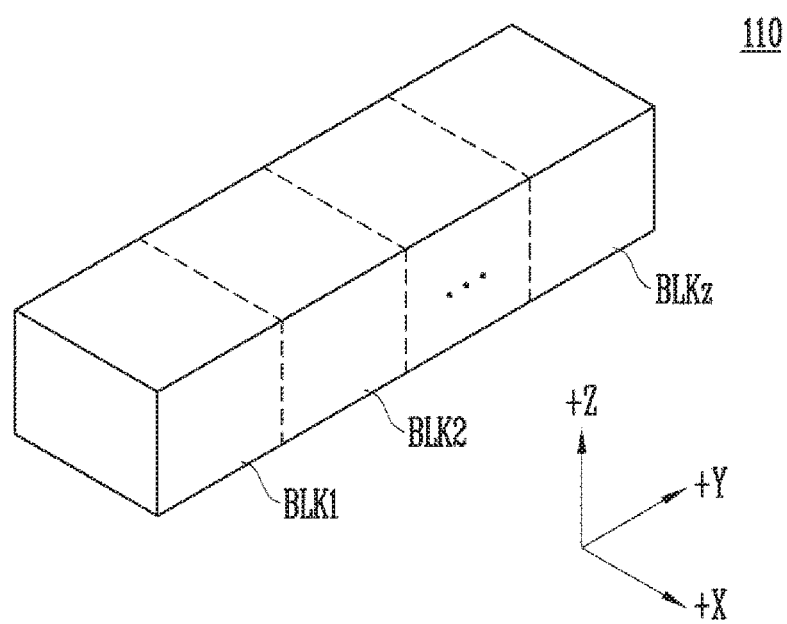
FIG. 3 is a diagram illustrating a memory cell array in accordance with an embodiment of the present disclosure.

FIG. 3 is a diagram illustrating a memory cell array, e.g., the memory cell array 110 shown in FIG. 2, in accordance with an embodiment of the present disclosure.

Referring to FIG. 3, the memory cell array 110 includes a plurality of memory blocks BLK1 to BLKz. Each memory block has a three-dimensional structure. Each memory block includes a plurality of memory cells stacked above a substrate. The plurality of memory cells are arranged along +X, +Y, and +Z directions. The structure of each memory block will be described in more detail with reference to FIGS. 4 and 5.

Figure 4:
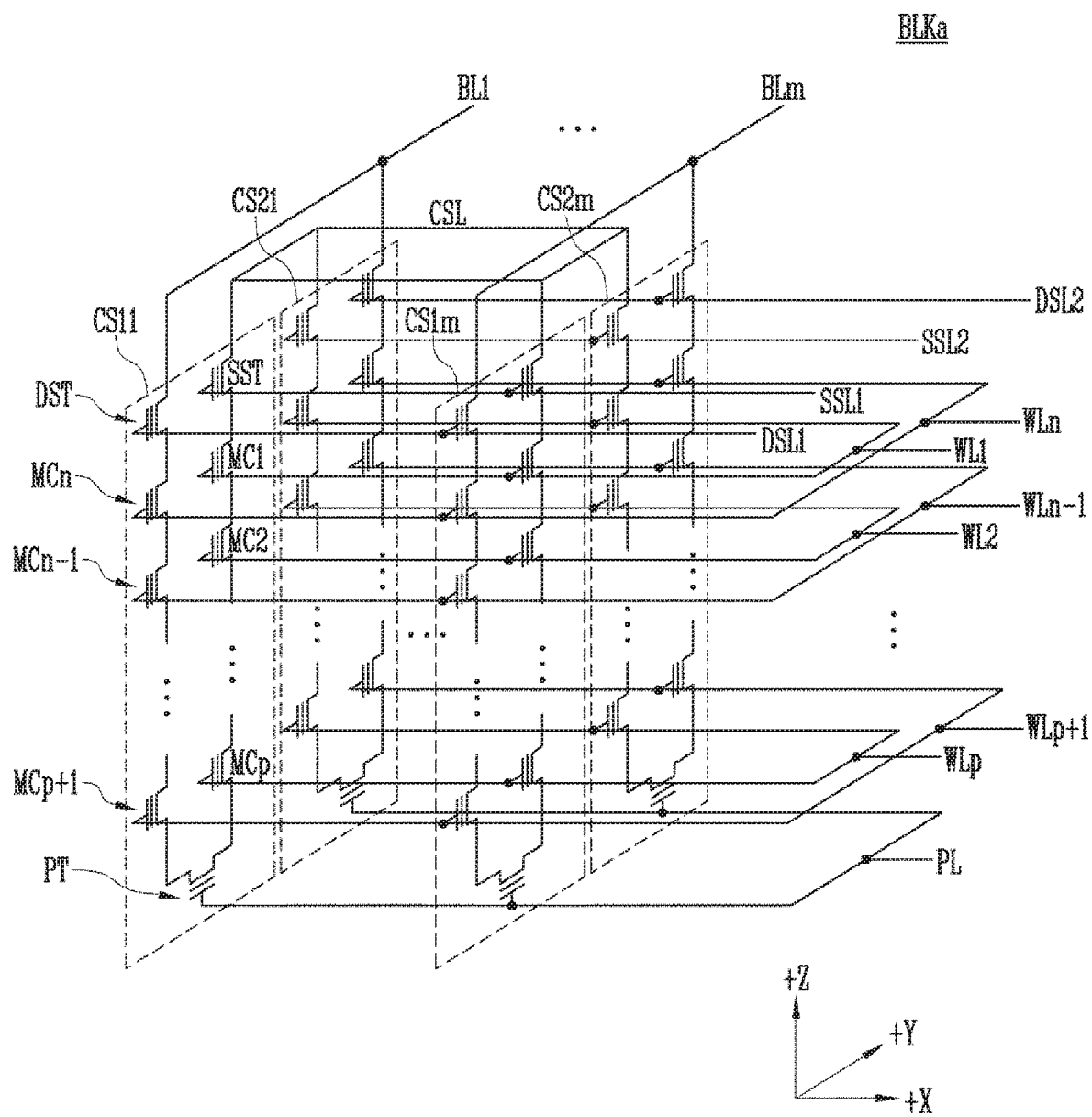
FIG. 4 is a circuit diagram illustrating a memory block in accordance with an embodiment of the present disclosure.

FIG. 4 is a circuit diagram illustrating a representative memory block BLKa, among the memory blocks BLK1 to BLKz, shown in FIG. 3.

Referring to FIG. 4, the memory block BLKa includes a plurality of cell strings CS11 to CS1$m$ and CS21 to CS2$m$. In an embodiment, each of the plurality of cell strings CS11 to CS1$m$ and CS21 to CS2$m$ may be formed in a 'U' shape. In the memory block BLKa, m cell strings are arranged in a row direction (i.e., a +X direction). Although FIG. 4 illustrates that two cell strings are arranged in a column direction (i.e., a +Y direction), it will be understood that three or more cell strings may be arranged in the column direction.

Each of the plurality of cell strings CS11 to CS1$m$ and CS21 to CS2$m$ includes at least one source select transistor SST, first to nth memory cells MC1 to MCn, a pipe transistor PT, and at least one drain select transistor DST.

The select transistors SST and DST and the memory cells MC1 to MCn may have structures similar to one another. In an embodiment, each of the select transistors SST and DST and the memory cells MC1 to MCn may include a channel layer, a tunneling insulating layer, a charge storage layer, and a blocking insulating layer. In an embodiment, a pillar for providing the channel layer may be provided in each cell string. In an embodiment, a pillar for providing at least one of the channel layers, the tunneling insulating layer, the charge storage layer, and the blocking insulating layer may be provided in each cell string.

The source select transistor SST of each cell string is coupled between a common source line CSL and memory cells MC1 to MCp.

In an embodiment, the source select transistors of cell strings arranged on the same row are coupled to a source select line extending in the row direction, and the source select transistors of cell strings arranged on different rows are coupled to different source select lines. The source select transistors of the cell strings CS11 to CS1$m$ on a first row are coupled to a first source select line SSL1. The source select transistors of the cell strings CS21 to CS2$m$ on a second row are coupled to a second source select line SSL2.

In another embodiment, the source select transistors of the cell strings CS11 to CS1$m$ and CS21 to CS2$m$ may be commonly coupled to one source select line.

The first to nth memory cells MC1 to MCn of each cell string are coupled between the source select transistor SST and the drain select transistor DST.

The first to nth memory cells MC1 to MCn may be divided into first to pth memory cells MC1 to MCp and a (p+1)th to nth memory cells MCp+1 to MCn. The first to pth memory cells MC1 to MCp are sequentially arranged in the opposite direction of a +Z direction, and are coupled in series between the source select transistor SST and the pipe transistor PT. The (p+1)th to nth memory cells MCp+1 to MCn are sequentially arranged in the +Z direction, and are coupled in series between the pipe transistor PT and the drain select transistor DST. The first to pth memory cells MC1 to MCp and the (p+1)th to nth memory cells MCp+1 to MCn are coupled through the pipe transistor PT. Gate electrodes of the first to nth memory cells MC1 to MCn of each cell string are coupled to first to nth word lines WL1 to WLn, respectively.

A gate of the pipe transistor PT of each cell string is coupled to a pipe line PL.

The drain select transistor DST of each cell string is coupled between a corresponding bit line and the memory cells MCp+1 to MCn. Cell strings arranged in the row direction are coupled to a drain select line extending in the row direction. The drain select transistors of the cell strings CS11 to CS1m on the first row are coupled to a first drain select line DSL1. The drain select transistors of the cell strings CS21 to CS2m on the second row are coupled to a second drain select line DSL2.

Cell strings arranged in the column direction are coupled to a bit line extending in the column direction. The cell strings CS11 and CS21 on a first column are coupled to a first bit line BL1. The cell strings CS1m and CS2m on an mth column are coupled to an mth bit line BLm.

Memory cells coupled to the same word line in the cell strings arranged in the row direction constitute one page. For example, memory cells coupled to the first word line WL1 in the cell strings CS11 to CS1m on the first row constitute one page. Memory cells coupled to the first word line WL1 in the cell strings CS21 to CS2m on the second row constitute another page. When any one of the drain select lines DSL1 and DSL2 is selected, cell strings arranged in one row direction may be selected. When any one of the word lines WL1 to WLn is selected, one page may be selected in the selected cell strings.

In another embodiment, even bit lines and odd bit lines may be provided instead of the first to mth bit lines BL1 to BLm. In addition, even-numbered cell strings among the cell strings CS11 to CS1m or CS21 to CS2m arranged in the row direction may be coupled to the even bit lines, respectively, and odd-numbered cell strings among the cell strings CS11 to CS1m or CS21 to CS2m arranged in the row direction may be coupled to the odd bit lines, respectively.

In an embodiment, at least one of the first to nth memory cells MC1 to MCn may be used as a dummy memory cell. For example, the dummy memory cell(s) may be provided to decrease an electric field between the source select transistor SST and the memory cells MC1 to MCp. Alternatively, the dummy memory cell(s) may be provided to decrease an electric field between the drain select transistor DST and the memory cells MCp+1 to MCn. When the number of dummy memory cells increases, the reliability of an operation of the memory block BLKa is improved. On the other hand, the size of the memory block BLKa increases. When the number of dummy memory cells decreases, the size of the memory block BLKa decreases. On the other hand, the reliability of an operation of the memory block BLKa may be deteriorated.

In order to efficiently control the dummy memory cell(s), the dummy memory cell(s) may have a required threshold voltage. Before or after an erase operation of the memory block BLKa, a program operation may be performed on all or some of the dummy memory cells. When an erase operation is performed after the program operation is performed, by having a voltage applied to the dummy word lines coupled to the respective dummy memory cells, the dummy memory cells can have the required threshold voltage.

Figure 5:
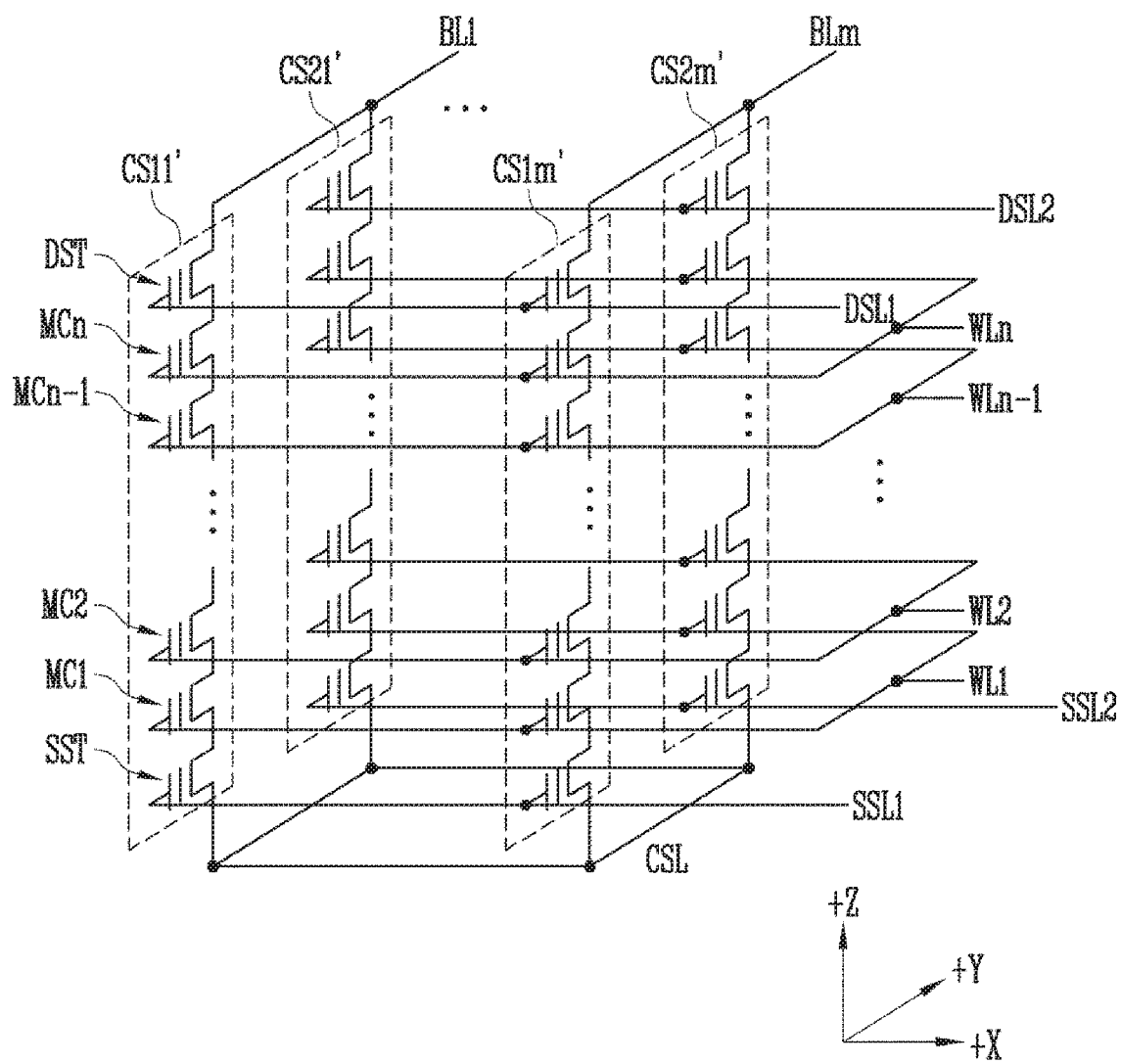
FIG. 5 is a circuit diagram illustrating a memory block in accordance with another embodiment of the present disclosure.

FIG. 5 is a circuit diagram illustrating another embodiment of a representative memory block BLKb, among the memory blocks BLK1 to BLKz, shown in FIG. 3.

Referring to FIG. 5, the memory block BLKb includes a plurality of cell strings CS11' to CS1m' and CS21' to CS2m'. Each of the plurality of cell strings CS11' to CS1m' and CS21' to CS2m' extends along the +Z direction. Each of the plurality of cell strings CS11' to CS1m' and CS21' to CS2m' includes at least one source select transistor SST, first to nth memory cells MC1 to MCn, and at least one drain select transistor DST, which are stacked on a substrate (not shown) under the memory block BLKb.

The source select transistor SST of each cell string is coupled between a common source line CSL and the memory cells MC1 to MCn. The source select transistors of cell strings arranged on the same row are coupled to the same source select line. The source select transistors of the cell strings CS11' to CS1m' arranged on a first row are coupled to a first source select line SSL1. Source select transistors of the cell strings CS21' to CS2m' arranged on a second row are coupled to a second source select line SSL2. In another embodiment, the source select transistors of the cell strings CS11' to CS1m' and CS21' to CS2m' may be commonly coupled to one source select line.

The first to nth memory cells MC1 to MCn of each cell string are coupled in series between the source select transistor SST and the drain select transistor DST. Gate electrodes of the first to nth memory cells MC1 to MCn are coupled to first to nth word lines WL1 to WLn, respectively.

The drain select transistor DST of each cell string is coupled between a corresponding bit line and the memory cells MC1 to MCn. The drain select transistors of cell strings arranged in the row direction are coupled to a drain select line extending in the row direction. The drain select transistors of the cell strings CS11' to CS1m' on the first row are coupled to a first drain select line DSL1. The drain select transistors of the cell strings CS21' to CS2m' on the second row are coupled to a second drain select line DSL2.

Consequently, the memory block BLKb of FIG. 5 has a circuit identical to that of the memory block BLKa of FIG. 4, except that the pipe transistor PT is excluded from each cell string.

In another embodiment, even bit lines and odd bit lines may be provided instead of the first to mth bit lines BL1 to BLm. In addition, even-numbered cell strings among the cell strings CS11' to CS1m' or CS21' to CS2m' arranged in the row direction may be coupled to the even bit lines, respectively, and odd-numbered cell strings among the cell strings CS11' to CS1m' or CS21' to CS2m' arranged in the row direction may be coupled to the odd bit lines, respectively.

In an embodiment, at least one of the first to nth memory cells MC1 to MCn may be used as a dummy memory cell. For example, the dummy memory cell(s) may be provided to decrease an electric field between the source select transistor SST and the memory cells MC1 to MCn. Alternatively, the dummy memory cell(s) may be provided to decrease an electric field between the drain select transistor DST and the memory cells MC1 to MCn. When the number of dummy memory cells increases, the reliability of an operation of the memory block BLKb is improved. On the other hand, the size of the memory block BLKb increases. When the number of dummy memory cells decreases, the size of the memory block BLKb decreases. On the other hand, the reliability of an operation of the memory block BLKb may be deteriorated.

In order to efficiently control the dummy memory cell(s), the dummy memory cell(s) may have a required threshold voltage. Before or after an erase operation of the memory block BLKb, a program operation may be performed on all or some of the dummy memory cells. When an erase operation is performed after the program operation is performed, by having a voltage applied to the dummy word lines coupled to the respective dummy memory cells, the dummy memory cells can have the required threshold voltage.

Figure 6:
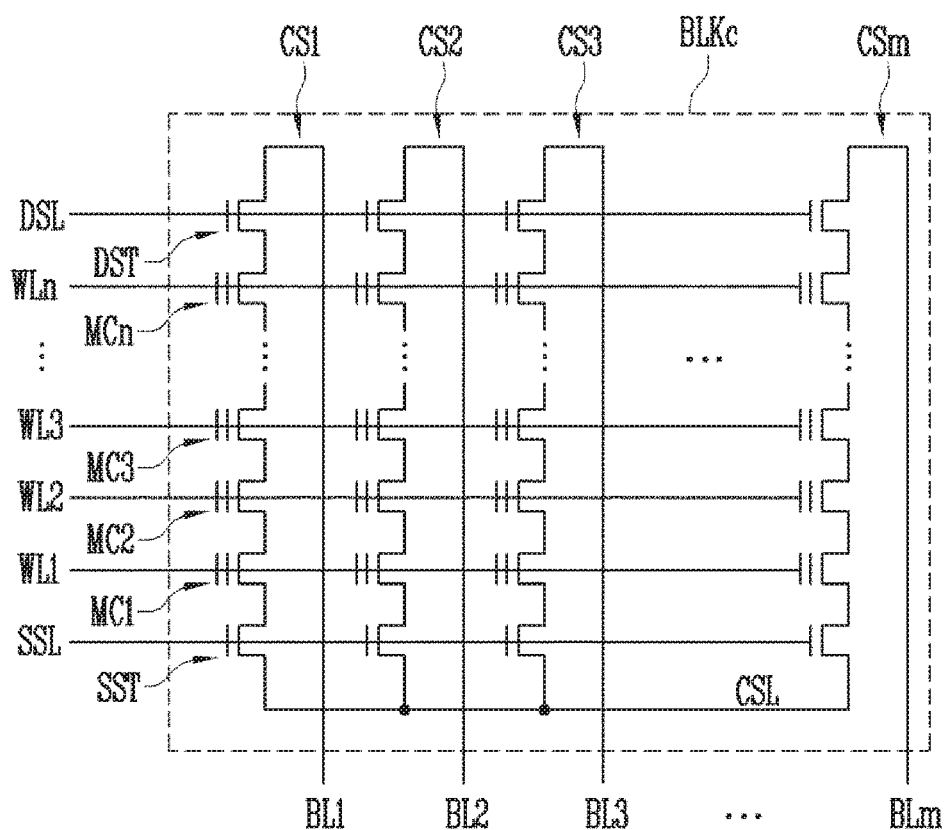
FIG. 6 is a circuit diagram illustrating a memory block in accordance with yet another embodiment of the present disclosure.

FIG. 6 is a circuit diagram illustrating yet another embodiment of a representative memory block BLKc, among the plurality of memory blocks BLK1 to BLKz, included in the memory cell array 110 shown in FIG. 2.

Referring to FIG. 6, the memory block BLKc includes a plurality of strings CS1 to CSm. The plurality of strings CS1 to CSm may be coupled to a plurality of bit lines BL1 to BLm, respectively. Each of the plurality of strings CS1 to CSm includes at least one source select transistor SST, first to nth memory cells MC1 to MCn, and at least one drain select transistor DST.

Each of the select transistors SST and DST and the memory cells MC1 to MCn may have a similar structure. In an embodiment, each of the select transistors SST and DST and the memory cells MC1 to MCn may include a channel layer, a tunneling insulating layer, a charge storage layer, and a blocking insulating layer. In an embodiment, a pillar for providing the channel layer may be provided in each cell string. In an embodiment, a pillar for providing at least one of the channel layers, the tunneling insulating layer, the charge storage layer, and the blocking insulating layer may be provided in each cell string.

The source select transistor SST of each cell string is coupled between a common source line CSL and the memory cells MC1 to MCn.

The first to nth memory cells MC1 to MCn of each cell string is coupled between the source select transistor SST and the drain select transistor DST.

The drain select transistor DST of each cell string is coupled between a corresponding bit line and the memory cells MC1 to MCn.

Memory cells coupled to the same word line constitute one page. As a drain select line DSL is selected, the cell strings CS1 to CSm may be selected. As any one of word lines WL1 to WLn is selected, one page among selected cell strings may be selected.

In another embodiment, even bit lines and odd bit lines may be provided instead of the first to mth bit lines BL1 to BLm. Even-numbered cell strings among the cell strings CS1 to CSm may be coupled to the even bit lines, respectively, and odd-numbered cell strings among the cell strings CS1 to CSm may be coupled to the odd bit lines, respectively.

As shown in FIGS. 3 to 5, the memory cell array 110 of the semiconductor memory device 100 may be configured as a memory cell array having a three-dimensional structure. In addition, as shown in FIG. 6, the memory cell array 110 of the semiconductor memory device 100 may be configured as a memory cell array having a two-dimensional structure.

Figure 7:
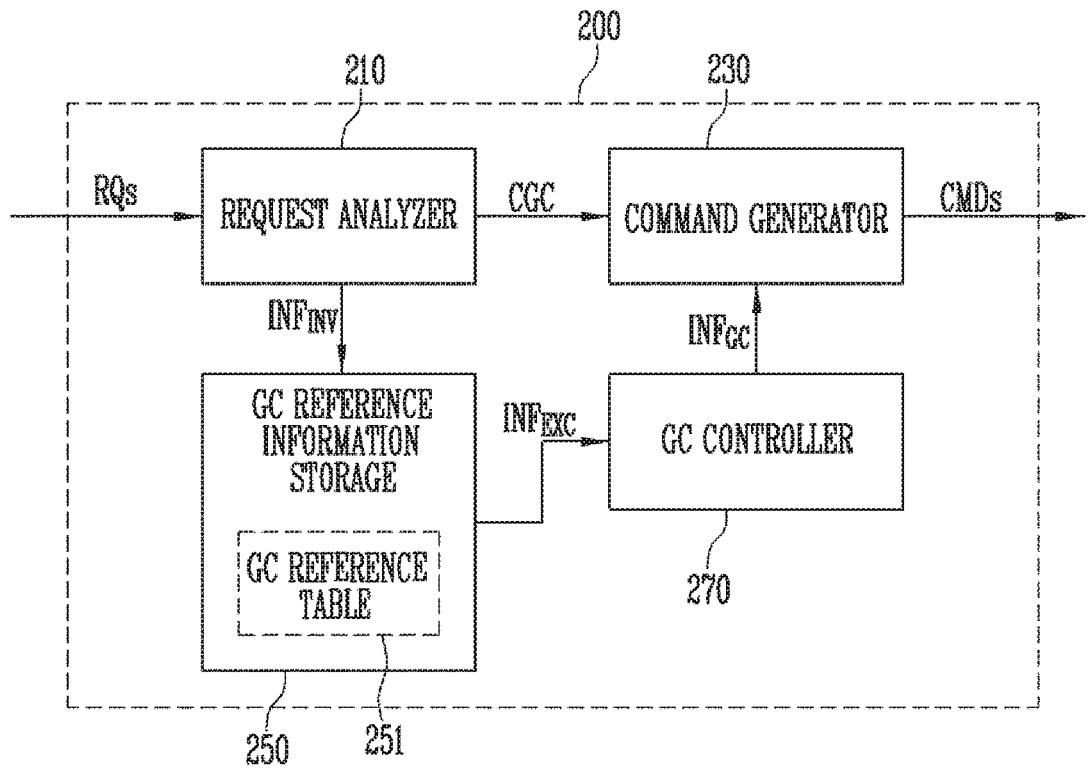
FIG. 7 is a block diagram illustrating a controller in accordance with an embodiment of the present disclosure.

FIG. 7 is a block diagram illustrating a controller 200 in accordance with an embodiment of the present disclosure.

Referring to FIG. 7, the controller 200 may include a request analyzer 210, a command generator 230, a garbage collection (GC) reference information storage 250, and a garbage collection (GC) controller 270.

The request analyzer 210 may analyze requests RQs received from a host (e.g., the host of FIG. 1). The host may transfer, to the controller 200, a write request for writing data to the semiconductor memory device 100 of FIG. 1, a read request for reading data from the semiconductor memory device 100, and an erase request for erasing data stored in the semiconductor memory device 100.

In general, erasing of memory cells in the semiconductor memory device 100 is performed in units of blocks. Hence, when data corresponding to the erase request is partial data of a memory block, only the corresponding data may be erased. Accordingly, when the controller 200 receives an erase request for specific data from the host, the controller 200 invalidates the corresponding data. When data is invalidated, the corresponding data in the semiconductor memory device 100 is not actually erased but maintained. However, since the invalidated data is data that is to be no longer used, the controller 200 may regard the invalidated data as garbage data. Accordingly, the controller 200 may maintain information on which data among data written in a specific memory block corresponds to valid data or invalid data.

The request analyzer 210 may generate invalid data information $INF_{INV}$, based on the erase request received from the host. The invalid data information $INF_{INV}$ may include information on data corresponding to the erase request. For example, the invalid data information $INF_{INV}$ may include address information, and size information on data invalidated corresponding to the erase request.

When the request received from the host is a read request or program request, the request analyzer 210 may generate a command generation control signal CGC for generating a command for reading data, and transfer the command generation control signal CGC to the command generator 230.

The invalid data information $INF_{INV}$ may be transferred to the GC reference information storage 250. The GC reference information storage 250 manages memory blocks to be excluded from a victim block of a garbage collection operation, based on the invalid data information $INF_{INV}$. More specifically, the GC reference information storage 250 may store a GC reference table 251 representing (or identifying) memory blocks excluded from selection as the victim block(s) on which the garbage collection operation is to be performed. The GC reference information storage 250 may update the GC reference table 251, based on the invalid data information $INF_{INV}$ received from the request analyzer 210.

In an embodiment, when the size of data corresponding to the erase request from the host is greater than a reference amount, denoted as a reference value, the GC reference information storage 250 may determine that a memory block in which the corresponding data is stored is to be excluded from the selection of the victim block for the garbage collection operation, with reference to the invalid data information $INF_{INV}$. The corresponding memory block may be registered in the GC reference table 251. An exemplary configuration of the GC reference table 251 will be described later with reference to FIGS. 10A and 10B. The GC reference information storage 250 may generate exclusion block information $INF_{EXC}$, based on the GC reference table 251 stored therein. The exclusion block information $INF_{EXC}$ includes information representing whether an individual memory block is to be excluded as a potential victim block for the garbage collection operation. The exclusion block information $INF_{EXC}$ is transferred to the GC controller 270.

The GC controller 270 may control the whole of the garbage collection operation on the semiconductor memory device 100. For example, the GC controller 270 may determine a start time of the garbage collection operation. Also, the GC controller 270 may determine victim blocks on which the garbage collection is to be performed. The GC controller 270 may select a target block that becomes a destination to which valid data of the victim block is copied. The GC controller 270 manages information including the number of valid and invalid pages of the memory blocks included in the semiconductor memory device 100, and the number of free blocks.

In the garbage collection operation, the GC controller 270 may generate garbage collection information $INF_{GC}$ including information on a selected victim block, information on a target block, information related to starting of the garbage collection operation. Further, the GC controller 270 may transfer the garbage collection information $INF_{GC}$ to the command generator 230. The GC controller 270 may select a victim block, based on the exclusion block information $INF_{EXC}$ received from the GC reference information storage 250. More specifically, the GC controller 270 may exclude a memory block specified by the exclusion block information $INF_{EXC}$ not to be selected as the victim block.

More specifically, the GC controller 270 checks the size of invalid pages of the memory blocks included in the semiconductor memory device 100 when the garbage collection operation is started. A memory block having a number of invalid pages greater than a threshold value may be selected as the victim block of the garbage collection operation. In accordance with an embodiment of the present disclosure, the GC controller 270 determines as the victim block, a memory block registered to the GC reference table 251 among memory blocks having a number of invalid pages greater than the threshold value.

The command generator 230 may generate commands CMDs for performing an actual garbage collection operation of the semiconductor memory device 100, based on the garbage collection information $INF_{GC}$ received from the GC controller 270. For example, the command generator 230 may generate a command for reading data of a valid page included in the victim block, and a command for programming the read data of the valid page in a target block. Further, the command generator 230 may transfer the generated commands to the semiconductor memory device 100.

The command generator 230 may generate a read command or program command, based on the command generation control signal CGC received from the request analyzer 210, in addition to the commands generated based on the garbage collection information $INF_{GC}$. The read command or program command generated based on the command generation control signal CGC may correspond to the read request or write request received from the host.

Figure 8:
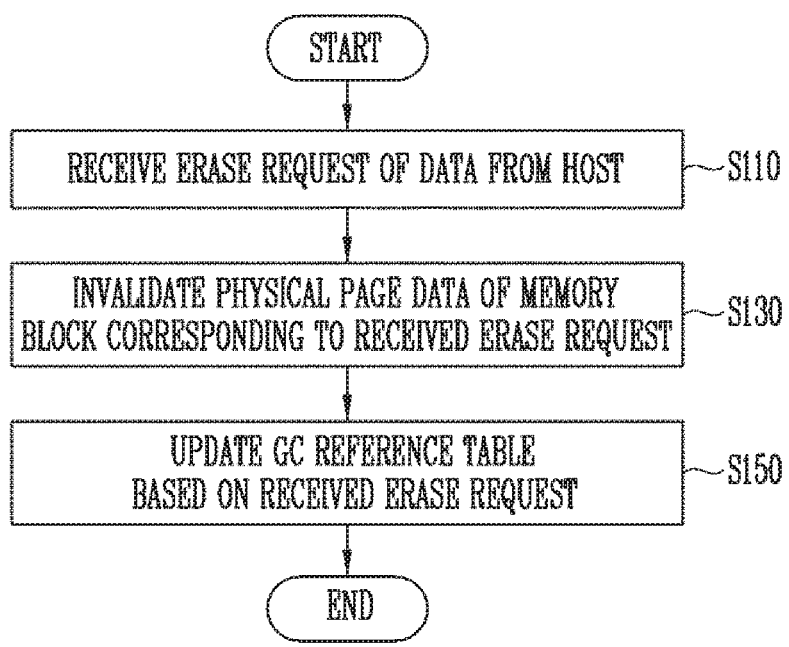
FIG. 8 is a flowchart illustrating an operating method of a controller in accordance with an embodiment of the present disclosure.

FIG. 8 is a flowchart illustrating an operating method of a controller, e.g., the controller 200 of FIG. 7, in accordance with an embodiment of the present disclosure. More specifically, the flowchart shown in FIG. 8 illustrates a method for updating the GC reference table 251 of FIG. 7, based on an erase request from the host. A method for performing an actual garbage collection operation, based on the GC reference table 251, will be described later with reference to FIGS. 14 to 17B.

Referring to FIG. 8, the operating method of the controller 200 may include step S110, step S130 and step S150. The step S110 includes receiving an erase request of data from the host. The step S130 includes invalidating physical page data of a memory block corresponding to the received erase request. The step S150 includes updating the GC reference table 251, based on the received erase request.

At the step S110, the controller 200 may receive an erase request for specific data from the host. The step S110 may be performed by the request analyzer 210 of the controller 200 shown in FIG. 7. The controller 200 may invalidate a physical page of a memory block corresponding to the received erase request (S130). At the step S130, data stored in the physical page of the memory block is not actually erased, and a physical page corresponding to the received erase request may be invalidated in a manner such that the controller updates a valid page list (not shown), and an invalid page list (not shown) therein.

Subsequently, at the step S150, the GC reference table 251 may be updated based on the erase request of data received from the host. The step S150 may be performed by the GC reference information storage 250 shown in FIG. 7. In various embodiments, when an erase request for data having a specific size or more is received from the host at the step S110, the GC reference information storage 250 excludes a memory block storing the corresponding data as a victim block for a garbage collection operation. Alternatively, when an erase request for consecutive Logical Block Addresses (LBAs) is received from the host at the step S110, the GC reference information storage 250 excludes a memory block storing corresponding data from the victim block of the garbage collection operation. Accordingly, a memory block, for which it is expected that all data will be invalidated at once, is excluded as a victim block for the garbage collection operation, so that the garbage collection operation is not performed. Consequently, the efficiency of the garbage collection operation is improved, and the Wear Acceleration Index (WAI) of the semiconductor memory device is lowered. Thus, the performance and lifespan of the semiconductor memory device may be enhanced.

Although FIG. 8 illustrate a case where the step S150 is performed after the step S130 of invalidating a physical page corresponding to the erase request, the operating method of the controller 200 is not limited thereto. That is, the step S150 may be performed before the step S130, or be performed in parallel to the step S130.

A more detailed description of the operations of step S150 is described below with reference to FIGS. 9 to 13.

Figure 10A:
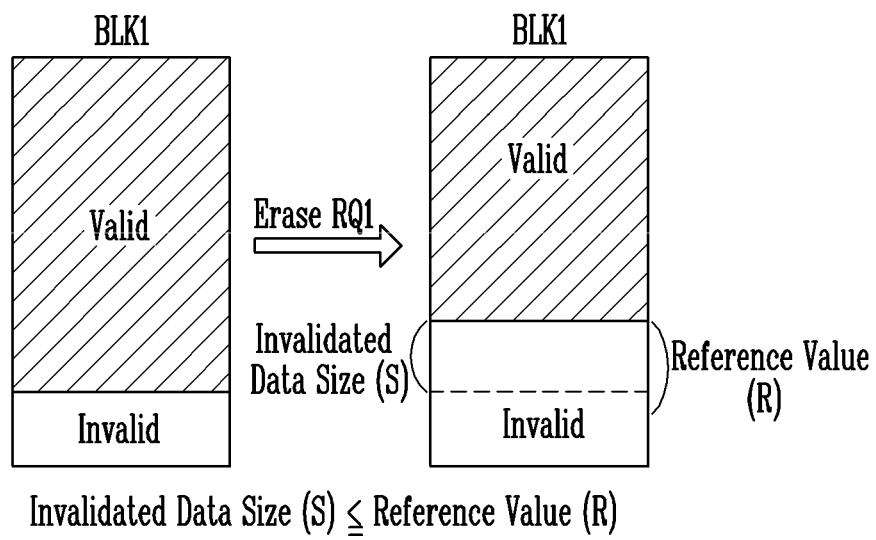
FIGS. 10A and 10B are diagrams illustrating an example of an operation of updating a garbage collection reference table.
Figure 10B:
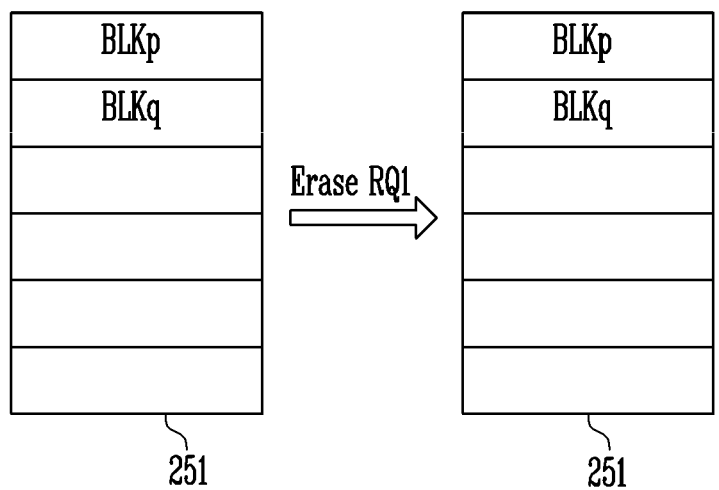
Figure 11A:
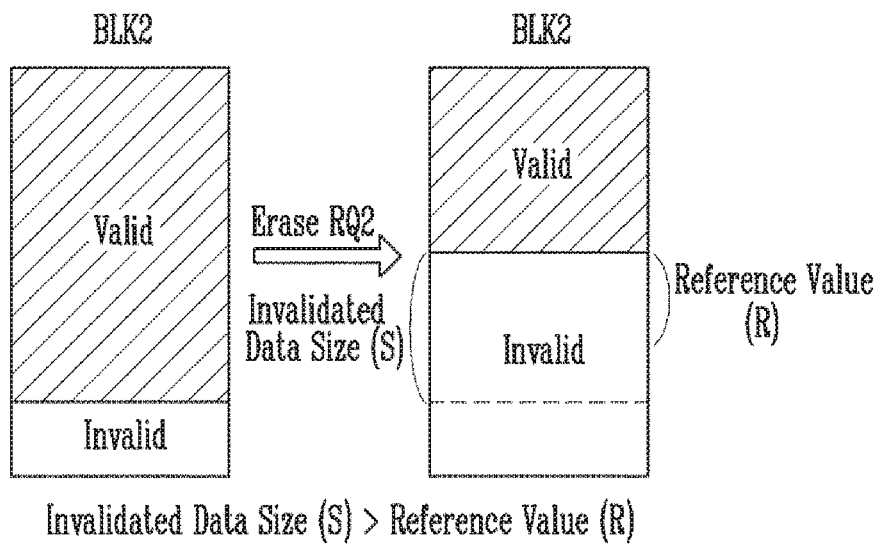
FIGS. 11A and 11B are another example of an operation of updating a garbage collection reference table.
Figure 11B:
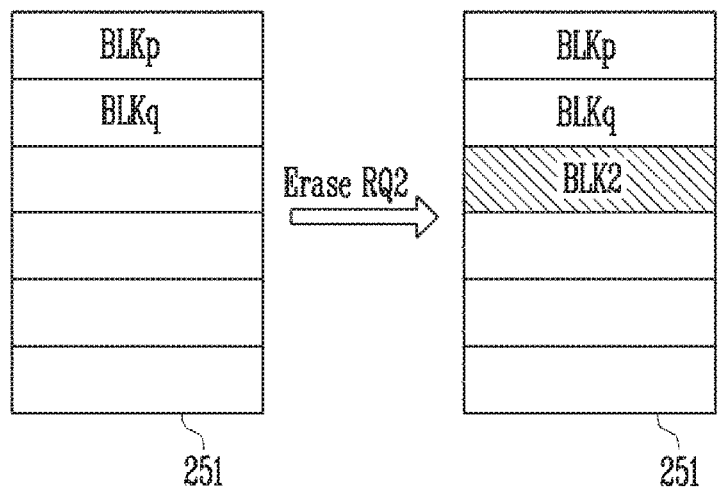

FIG. 9 is a flowchart illustrating an operation of updating a garbage collection reference table in accordance with an embodiment of the present disclosure, for example, operation of the step S150 shown in FIG. 8. FIGS. 10A and 10B are diagrams illustrating an example of an operation of updating a garbage collection reference table, that is, an example of the method according to the flowchart shown in FIG. 9. FIGS. 11A and 11B are diagrams illustrating another example of an operation of updating a garbage collection reference table, that is, another example of the method according to the flowchart shown in FIG. 9. Now S150 will be described with reference to FIGS. 8, 9, 10A, 10B, 11A, and 11B together.

Referring to FIG. 9, the step S150 of updating the GC reference table based on the data erase request includes steps S210, S230, S250 and S270. The step S210 includes checking a size S of data corresponding to the erase request received from the host. The step S230 includes determining whether the data size S is greater than a reference value R. When it is determined that the data size S is greater than the reference value R (S230, YES), step S250 is performed. The step S250 includes checking whether a memory block corresponding to the erase request has already been registered in the GC reference table 251. When the check determines that the memory block corresponding to the erase request has not been registered in the GC reference table 251 (S250, NO), step S270 is performed. The step S270 includes registering the corresponding memory block in the GC reference table 251.

Referring to FIG. 10A, a memory block BLK1 before an erase request Erase RQ1 is received from the host and the memory block BLK1 after data is invalidated according to the erase request Erase RQ1 are illustrated.

Referring to FIG. 10B, the GC reference table 251 before the erase request Erase RQ1 is received from the host and the GC reference table 251 updated according to the erase request Erase RQ1 are illustrated.

Referring back to FIG. 8, an erase request Erase RQ1 may be received from the host at the step S110, and a physical page corresponding to the erase request Erase RQ1 may be invalidated at the step S130. Accordingly, the size of invalidated data of the memory block BLK1 is increased by a size S as shown in FIG. 10A.

Referring back to FIG. 9, at the step S210, the size S of the invalidated data is checked. Subsequently, at the step S230, it is determined whether the corresponding data size S is greater than the reference value R. According to the example shown in FIG. 10A, the size S of invalidated data is not greater than the reference value R. Accordingly, the steps S250 and S270 are not performed, and the process ends as a result of the determination made at the step S230. Since the size S of invalidated data is not greater than the reference value R, the corresponding memory block BLK1 may not be added to the GC reference table 251 as shown in FIG. 10B.

Referring to FIG. 11A, a memory block BLK2 before an erase request Erase RQ2 is received from the host and the memory block BLK2 after data is invalidated according to the erase request Erase RQ2 are illustrated.

Referring to FIG. 10B, the GC reference table 251 before the erase request Erase RQ2 is received from the host and the GC reference table 251 updated according to the erase request Erase RQ2 are illustrated.

Referring back to FIG. 8, an erase request Erase RQ2 may be received from the host at the step S110, and a physical page corresponding to the erase request Erase RQ2 may be invalidated at the step S130. Accordingly, the size of invalidated data of the memory block BLK2 is increased by a size S as shown in FIG. 11A.

Referring back to FIG. 9, at the step S210, the size S of the invalidated data is checked. Subsequently, at the step S230, it is determined whether the corresponding data size S is greater than the reference value R. According to the example shown in FIG. 11A, the size S of invalidated data is greater than the reference value R. Accordingly, the controller 200 proceeds to the step S250 as a result of the determination made the step S230.

Referring to FIG. 11B, before the erase request Erase RQ2 is received, only memory blocks BLKp and BLKq are registered in the GC reference table 251, and the memory block BLK2 is not registered. Therefore, the controller 200 proceeds to the step S270 to register the memory block BLK2 in the GC reference table 251. When the memory block BLK2 has been registered in the GC reference table 251 before the erase request Erase RQ2 is received, unlike the situation of FIG. 11B, the memory block BLK2 may not be registered again in the GC reference table 251.

FIG. 12 is a flowchart illustrating an operation of updating a garbage collection reference table in accordance with an embodiment of the present disclosure, for example, the step S150 shown in FIG. 8.

Referring to FIG. 12, the step S150 may include steps S310, S330, S350 and S370. The step S310 includes checking a Logical Block Address LBA of data corresponding to the erase request. The step S330 includes determining whether the data corresponding to the erase request is sequential data having consecutive LBAs. When it is determined that the data corresponding to the erase request is sequential data having consecutive LBAs (S330, YES), the step S350 is performed. The step S350 includes determining whether a corresponding memory block has already been registered in the GC reference table 251. When it is determined that the corresponding memory block is not registered in the GC reference table 251 (S350, NO), the step S370 is performed. The step S370 includes, registering a memory block corresponding to the erase request in the GC reference table 251.

Referring to FIGS. 9 and 12 together, in the embodiment shown in FIG. 9, a corresponding memory block is registered in the GC reference table 251 when it is determined that the size S of invalidated data corresponding to the erase request is greater than the reference value R. However, in the embodiment shown in FIG. 12, a corresponding memory block is registered in the GC reference table 251 when it is determined that LBAs of invalidated data corresponding to the erase request are consecutive, i.e., when the invalidated data is sequential data.

Figure 13:
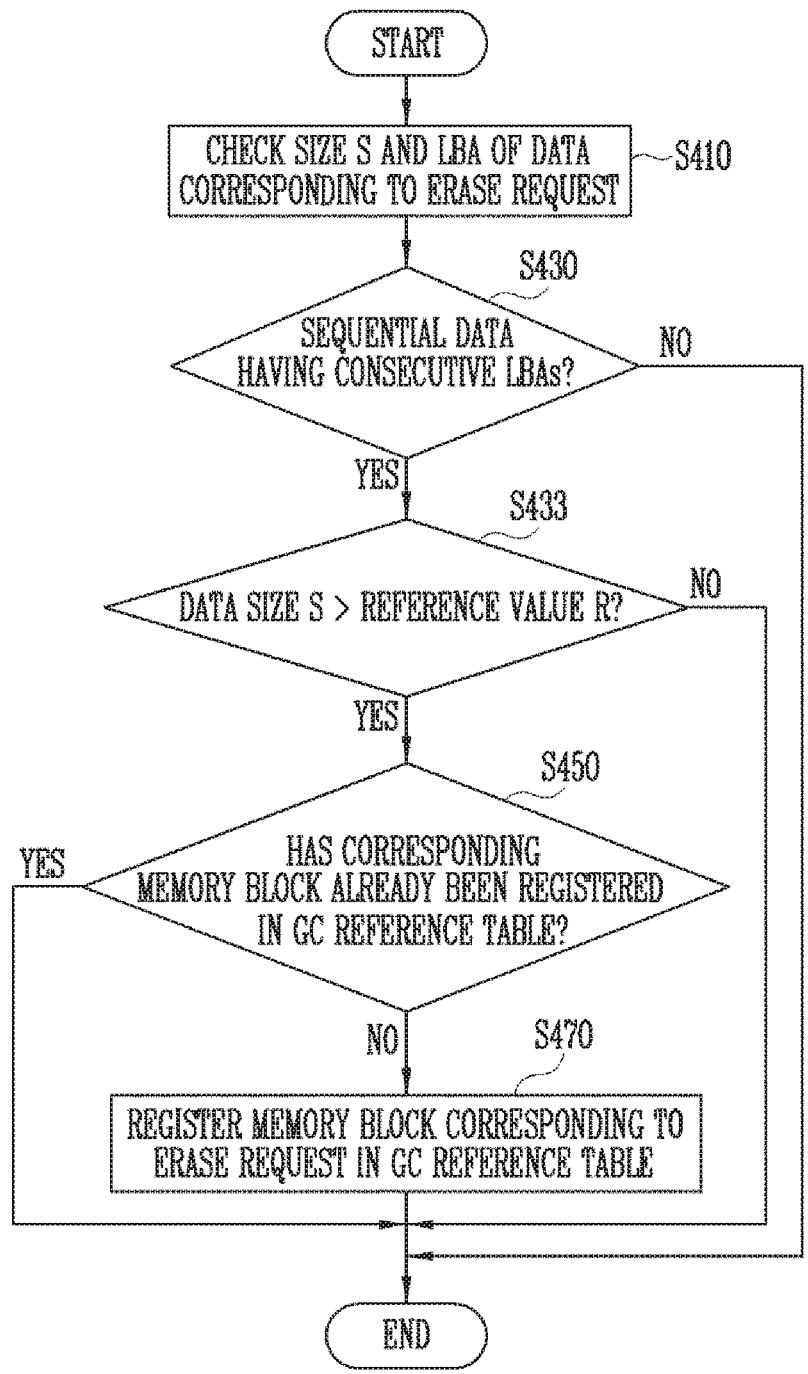
FIG. 13 is a flowchart illustrating an operation of updating a garbage collection reference table in accordance with an embodiment of the present disclosure.

FIG. 13 is a flowchart illustrating an operation of updating a garbage collection reference table in accordance with an embodiment of the present disclosure, for example, the step S150 shown in FIG. 8.

Referring to FIG. 13, the step S150 may include steps S410, S430, S433, S450 and S470. The step S410 includes checking a size S and a Logical Block Address (LBA) of data corresponding to the erase request. The step S430 includes determining whether the data corresponding to the erase request is sequential data having consecutive LBAs. When it is determined that the data corresponding to the erase request is sequential data having consecutive LBAs (S430, YES), the step S430 is performed. The step S433 includes determining whether the data size S is greater than a reference value R. When it is determined that the data size S is greater than the reference value R (S433, YES), the step S450 is performed. The step S450 includes checking whether a memory block corresponding to the erase request has already been registered in the GC reference table 251. When it is determined that the memory block corresponding to the erase request is not registered in the GC reference table 251 (S450, NO), the step S470 is performed. The step S470 includes registering the corresponding memory block in the GC reference table 251.

The embodiment shown in FIG. 13 is combination of the embodiments shown in FIGS. 9 and 12. That is, in the embodiment shown in FIG. 9, it is determined whether a corresponding memory block has been registered in the GC reference table 251, based on the size of data corresponding to the erase request. In the embodiment shown in FIG. 12, it is determined whether a corresponding memory block has been registered in the GC reference table 251, based on whether the data corresponding to the erase request is sequential data having consecutive LBAs. However, in the embodiment shown in FIG. 13, it is determined whether a corresponding memory block has been registered in the GC reference table 251, based on both the size of data corresponding to the erase request and whether the data corresponding to the erase request is sequential data having consecutive LBAs.

As described above, in various embodiments, when the size of data corresponding to the erase request is greater than the reference value or when the data corresponding to the erase request is sequential data having consecutive LBAs, a corresponding memory block is registered in the GC reference table not to be selected as a victim block for a subsequent garbage collection operation. Accordingly, an unnecessary garbage collection operation on valid data expected to be erased at once may be prevented.

Figure 14:
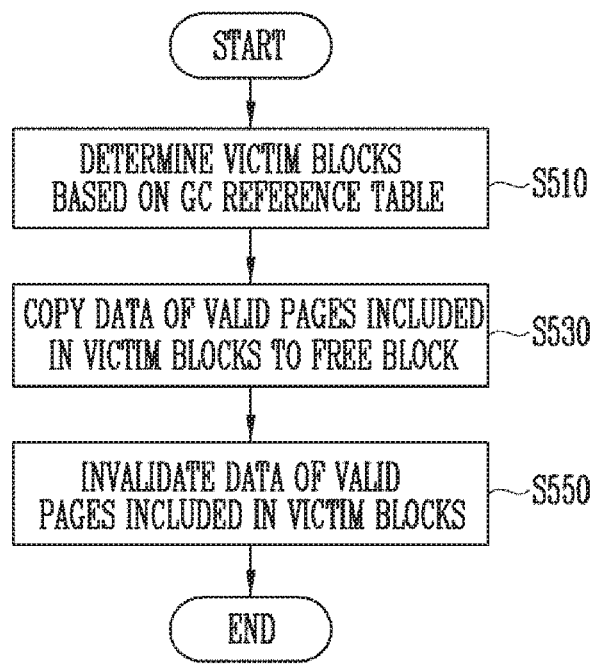
FIG. 14 is a flowchart illustrating an operating method of a controller in accordance with an embodiment of the present disclosure.

FIG. 14 is a flowchart illustrating an operating method of a controller, e.g., the controller 200 of FIG. 7, in accordance with another embodiment of the present disclosure. A method for performing an actual garbage collection operation, based on the GC reference table 251 of FIG. 7, is illustrated in FIG. 14.

Referring to FIG. 14, the operating method of the memory controller may include steps S510, S530 and S550. The step S510 includes determining victim blocks, based on the GC reference table 251. The step S530 includes copying data of valid pages included in the victim blocks to a free block. The step S550 includes invalidating the data of the valid pages included in the victim blocks.

At the step S510, a victim block on which a garbage collection operation is to be performed is determined based on the GC reference table 251 updated according to the method described with reference to FIGS. 8 to 13. The step S510 may be performed by the GC controller 270 shown in FIG. 7. In various embodiments, the GC controller 270 determines, as victim blocks, other memory blocks not registered in the GC reference table 251 among memory blocks of which invalid page has a size I that is greater than a threshold value THR among all of the memory blocks BLK1 to BLKz in the semiconductor memory device 100. A more detailed configuration of the step S510 will be described later with reference to FIG. 15.

At the step S530, data of valid pages included in the determined victim blocks is copied to a free block. The free block to which the data of the valid pages is copied is referred to as a target block.

At the step S550, after the valid pages of the victim blocks are all copied to the target block, the valid pages of the original victim blocks are invalidated. Accordingly, the garbage collection operation is completed.

The steps S530 and S550 will be described in more detail with reference to FIGS. 17A and 17B.

Figure 15:
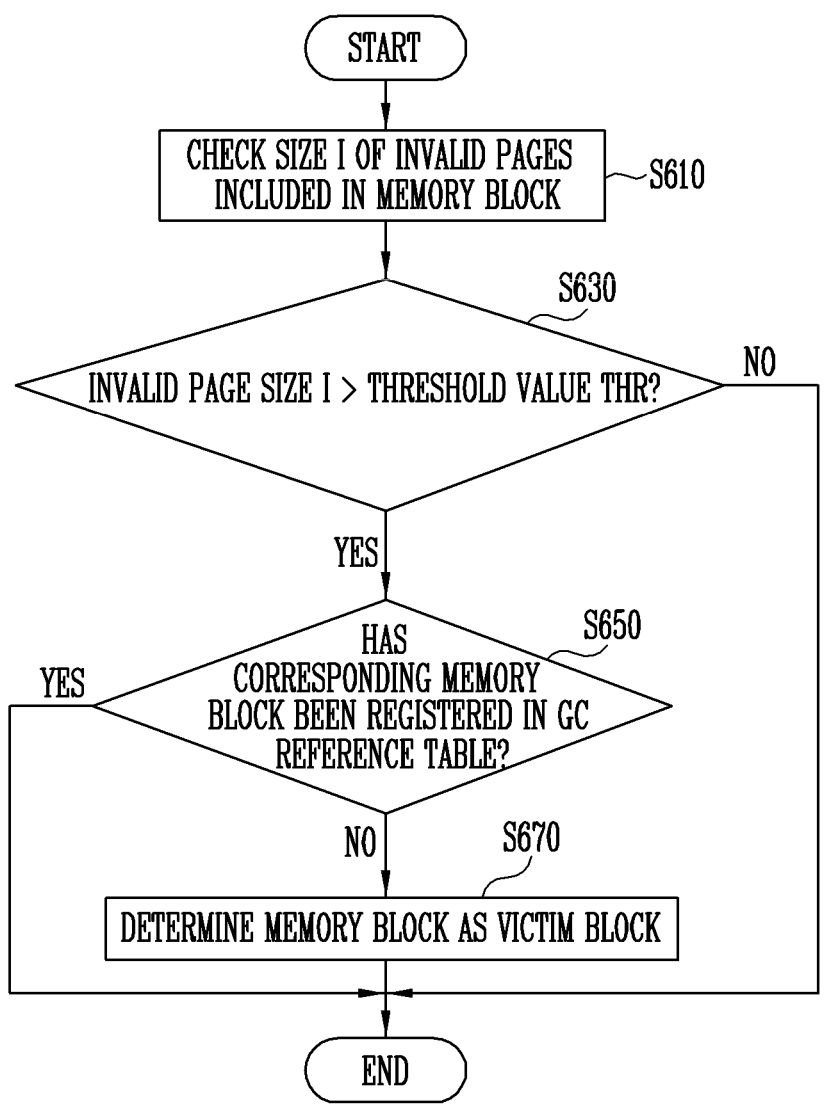
FIG. 15 is a flowchart illustrating an operation of determining victim blocks in accordance with an embodiment of the present disclosure.

FIG. 15 is a flowchart illustrating an embodiment of the step S510 shown in FIG. 14. Specifically, the flowchart shown in FIG. 15 illustrates an operation of determining whether one individual memory block storing valid data among the memory blocks BLK1, . . . , and BLKz included in the semiconductor memory device 100 is to be selected as a victim block of the garbage collection operation. That is, a method according to the flowchart shown in FIG. 15 is performed on each memory block storing valid data, among the memory blocks BLK1, . . . , and BLKz included in the semiconductor memory device 100, so that it can be determined whether the corresponding memory block is to become a victim block of the garbage collection operation.

Figure 16:
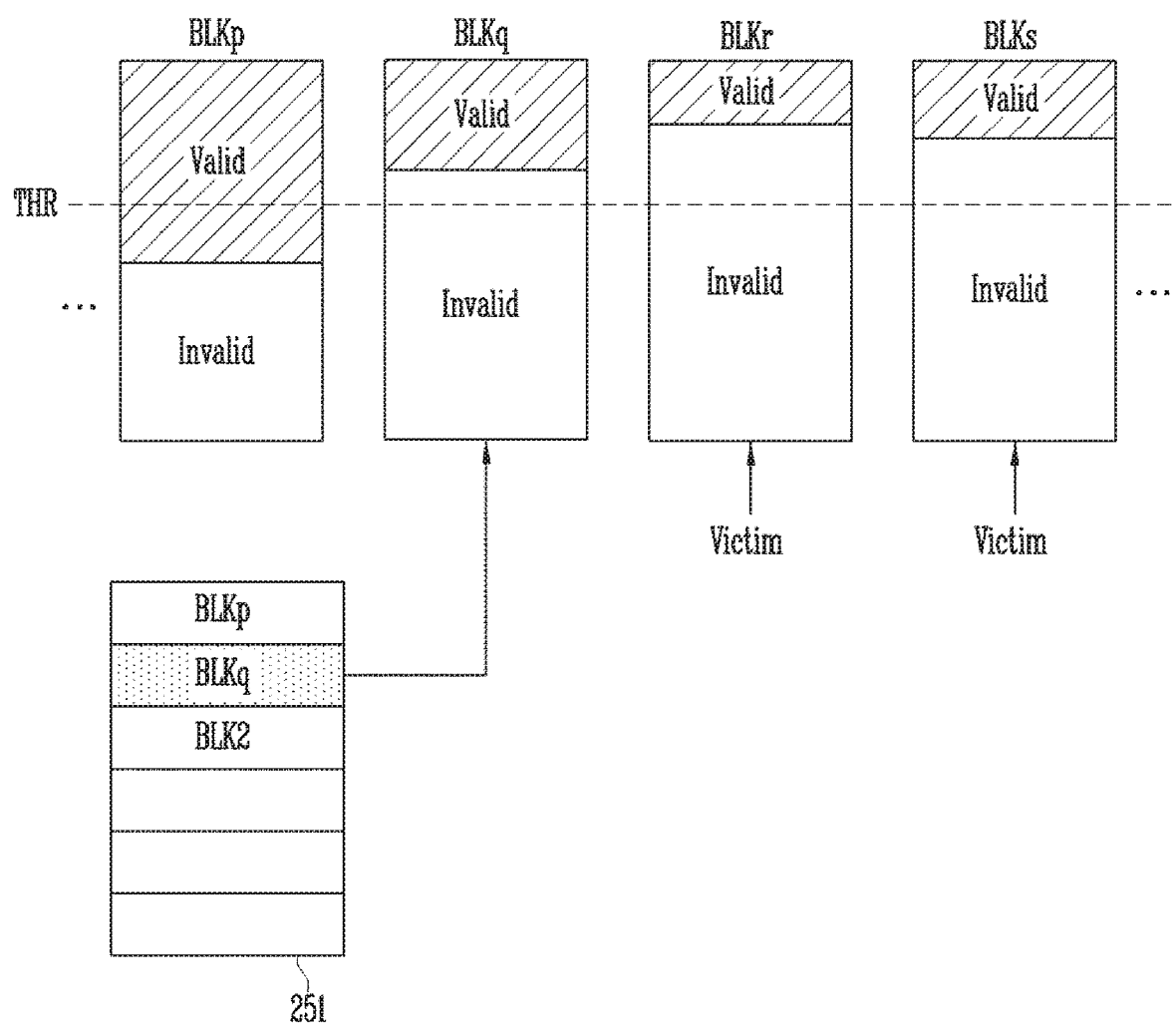
FIG. 16 is a diagram illustrating an operation of determining victim blocks in accordance with an embodiment of the present disclosure.

FIG. 16 is a diagram illustrating an operation of determining victim blocks in accordance with an embodiment of the present disclosure, for example, the step S510 according to the flowchart shown in FIG. 14. Such operation is described with reference to FIGS. 15 and 16 together.

Referring back to FIG. 15, the step S510 includes steps S610, S630, S650 and S670. The step S610 includes checking a size I of invalid pages included in a memory block. The step S630 includes determining whether the invalid page size I is greater than a threshold value THR. When it is determined that the invalid page size I is greater than the threshold value THR (S630, YES), step S650 is performed. The step S650 includes determining whether the corresponding memory block has been registered in the GC reference table 251. When it is determined that the corresponding memory block has not been registered in the GC reference table 251 (S650, NO), step S670 is performed. The step S670 includes determining the corresponding memory block as a victim block.

Referring to FIG. 16, memory blocks BLKp, BLKq, BLKr, and BLKs storing valid pages are illustrated. The GC controller 270 of FIG. 7 may check whether an invalid page size I is greater than the threshold value THR with respect to an individual memory block (S630). As the determination result of the step S630, since the memory block BLKp has an invalid page size I not greater than the threshold value THR, the memory block BLKp is excluded from selection of victim blocks. Each of the memory blocks BLKq, BLKr, and BLKs has an invalid page size I greater than the threshold value THR. Therefore, the method proceeds to the step S650 to determine whether each of the memory blocks BLKq, BLKr, and BLKs is a memory block that has been registered in the GC reference table 251.

As shown in FIG. 16, the memory blocks BLKp, BLKq, and BLK2 are registered in the GC reference table 251. The memory block BLKq among the memory blocks BLKq, BLKr, and BLKs each having an invalid page size I greater than the threshold value THR is registered in the GC reference table 251. Therefore, the memory block BLKq is not determined as a victim block as a result of determination made in the step S650. The memory blocks BLKr and BLKs among the memory blocks BLKq, BLKr, and BLKs are not registered in the GC reference table 251. Therefore, the memory blocks BLKr and BLKs are determined as victim blocks as the determination result of the step S650.

As described above, in various embodiments, memory blocks registered in the GC reference table 251 are excluded from selection of victim blocks for the garbage collection operation.

Figure 17A:
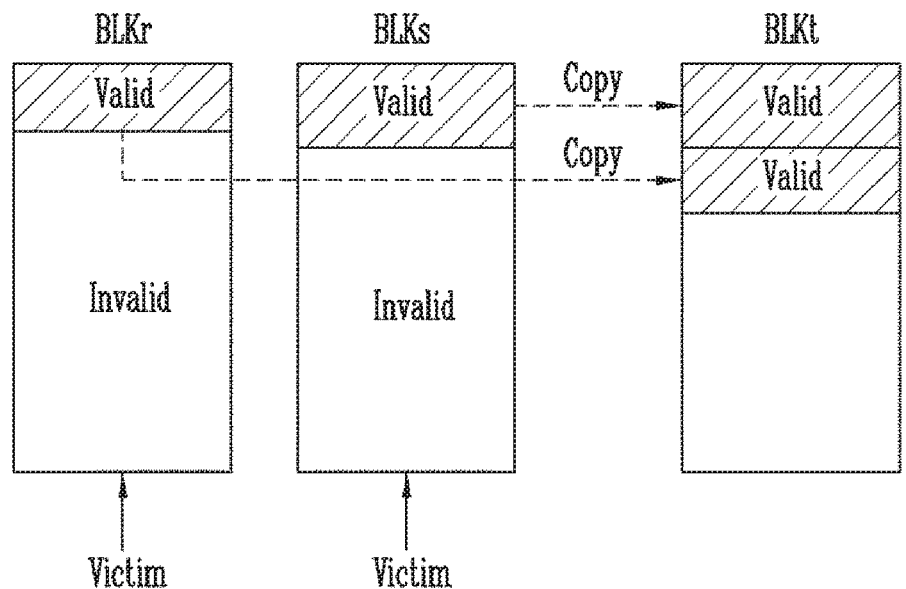
FIGS. 17A and 17B are diagrams respectively illustrating operations of copying data of valid pages and invalidating data of valid pages in accordance with an embodiment of the present disclosure.
Figure 17B:
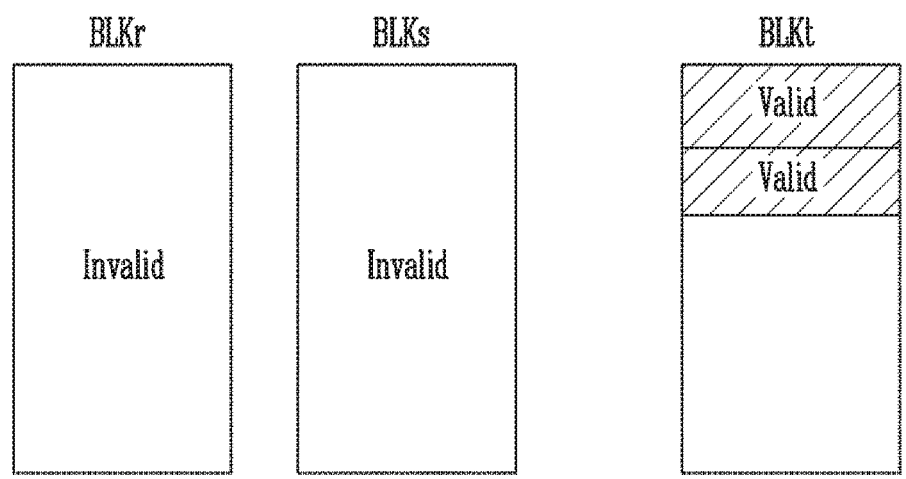

FIGS. 17A and 17B are diagrams respectively illustrating operations of copying data of valid pages and invalidating data of valid pages in accordance with an embodiment of the present disclosure, for example, the steps S530 and S550 shown in FIG. 14.

Referring back to FIG. 16, the memory blocks BLKr and BLKs that are not registered in the GC reference table 251 among the memory blocks BLKq, BLKr, and BLKs each having an invalid page size I greater than the threshold value THR have been selected as victim blocks. Referring to FIG. 17A, valid page data of the memory blocks BLKr and BLKs selected as the victim blocks is copied to a memory block BLKt that is a target block (S530 of FIG. 14).

Referring to FIG. 17B, after valid pages are copied, the valid page data included in the victim blocks are all invalidated (S550 of FIG. 14). Accordingly, the memory blocks BLKr and BLKs become free blocks, to be used in storage of other data.

Figure 18:
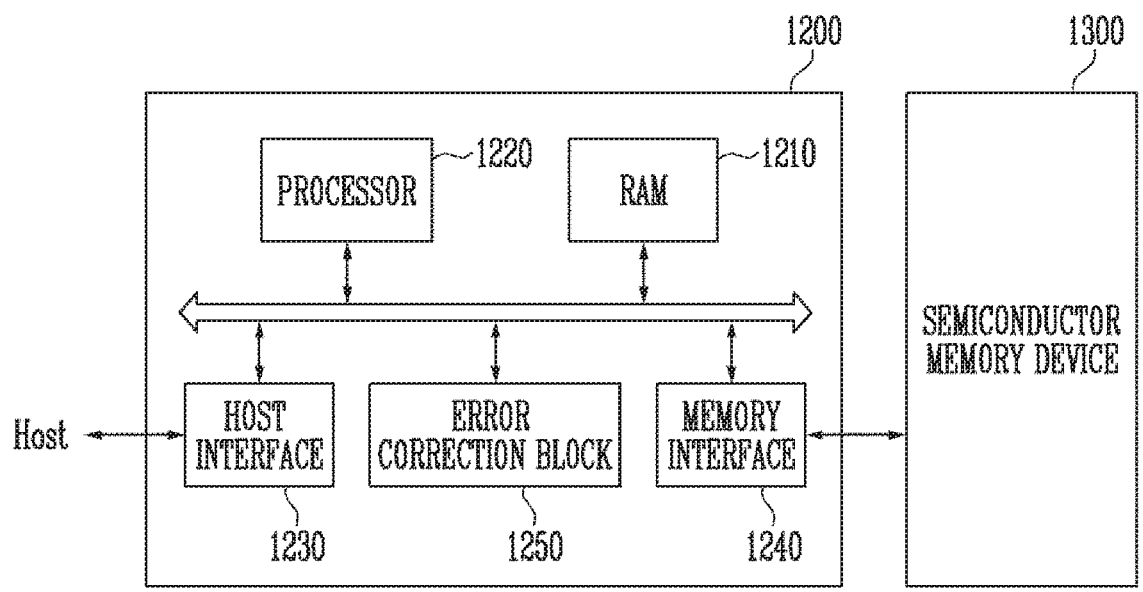
FIG. 18 is a block diagram illustrating an example of a memory system including the semiconductor memory device shown in FIG. 2 and the controller shown in FIG. 7.

FIG. 18 is a block diagram illustrating a memory system 1000 including the semiconductor memory device shown in FIG. 2 and the controller shown in FIG. 7.

Referring to FIG. 18, the memory system 1000 includes a semiconductor memory device 1300 and a controller 1200.

The semiconductor memory device 1300 may be configured and operated identically to the semiconductor memory device 100 described with reference to FIG. 2.

The controller 1200 is coupled to a host (Host) and the semiconductor memory device 1300. The controller 1200 is configured to access the semiconductor memory device 1300 in response to a request from the host (Host). For example, the controller 1200 is configured to control read, program, erase, and background operations of the semiconductor memory device 1300. The controller 1200 is configured to provide an interface between the semiconductor memory device 1300 and the host. The controller 1200 is configured to drive firmware for controlling the semiconductor memory device 1300.

The controller 1200 includes a random access memory (RAM) 1210, a processor 1220, a host interface 1230, a memory interface 1240, and an error correction block 1250.

The RAM 1210 is used as any one of a working memory of the processor 1220, a cache memory between the semiconductor memory device 1300 and the host, and a buffer memory between the semiconductor memory device 1300 and the host.

The processor 1220 controls overall operations of the controller 1200. The processor 1220 controls a read, program, erase, and background operations of the semiconductor memory device 1300. The processor 1220 drives firmware for controlling the semiconductor memory device 1300. The processor 1220 may perform a function of a flash translation layer (FTL). The processor 1220 may translate a logical block address (LBA) provided by the host through the FTL into a physical block address (PBA). The FTL may translate a received LBA, using a mapping table, into a PBA. Several address mapping methods of the FTL exist according to mapping units. A representative address mapping method includes a page mapping method, a block mapping method, and a hybrid mapping method.

The request analyzer 210, the command generator 230, the GC reference information storage 250, and the GC controller 270, which are shown in FIG. 7, may be implemented in the form of software or firmware driven by the processor 1220.

The host interface 1230 includes a protocol for exchanging data between the host and the controller 1200. In an embodiment, the controller 1200 is configured to communicate with the host through at least one of various interface protocols, such as a Universal Serial Bus (USB) protocol, a Multi-Media Card (MMC) protocol, a Peripheral Component Interconnection (PCI) protocol, a PCI-Express (PCI-e or PCIe) protocol, an Advanced Technology Attachment (ATA) protocol, a Serial-ATA protocol, a Parallel-ATA protocol, a Small Computer System Interface (SCSI) protocol, an Enhanced Small Disk Interface (ESDI) protocol, an Integrated Drive Electronics (IDE) protocol, and a private protocol.

The memory interface 1240 interfaces with the semiconductor memory device 1300. For example, the memory interface 1240 may include a NAND interface or a NOR interface.

The error correction block 1250 is configured to detect and correct an error of data received from the semiconductor memory device 1300 by using an error correction code (ECC). The error correction block 1250 may correct an error of read page data, using an ECC. The error correction block 1250 may correct an error, using coded modulation including low density parity check (LDPC) code, Bose, Chaudhuri, and Hocquenghem (BCH) code, turbo code, Reed-Solomon code, convolution code, recursive systematic code (RSC), trellis-coded modulation (TCM), block coded modulation (BCM), Hamming code, etc.

In a read operation, the error correction block 1250 may correct an error of read page data. When the number of error bits in the data of the read page exceeds an error correctable bit number, decoding may fail. When the number of error bits in such data is less than or equal to the error correctable bit number, the decoding may succeed. Successful decoding represents that data associated with a corresponding read command has been successfully decoded. Failed decoding represents that data associated with the corresponding command has not been successfully decoded. When the decoding succeeds, the controller 1200 outputs the error-corrected page data to the host.

The controller 1200 and the semiconductor memory device 1300 may be integrated into one semiconductor device. In an embodiment, the controller 1200 and the semiconductor memory device 1300 may be integrated into one semiconductor device to constitute a memory card, such as a PC card (Personal Computer Memory Card International Association (PCMCIA)), a Compact Flash (CF) card, a Smart Media Card (SM or SMC), a memory stick, a Multi-Media Card (MMC, RS-MMC or MMCmicro), an SD Card (SD, miniSD, microSD or SDHC), or a Universal Flash Storage (UFS).

The controller 1200 and the semiconductor memory device 1300 may be integrated into one semiconductor device to constitute a semiconductor drive (e.g., solid state drive (SSD)). The solid state drive SSD includes a storage device configured to store data in a semiconductor memory. If the memory system 1000 is used as the solid state drive SSD, the operating speed of the host coupled to the memory system 1000 can be remarkably improved.

As another example, the memory system 1000 may be provided as one of various components of an electronic device such as a computer, an Ultra Mobile PC (UMPC), a workstation, a net-book, a Personal Digital Assistant (PDA), a portable computer, a web tablet, a wireless phone, a mobile phone, a smart phone, an e-book, a Portable Multimedia Player (PMP), a portable game console, a navigation system, a black box, a digital camera, a 3-dimensional television, a digital audio recorder, a digital audio player, a digital picture recorder, a digital picture player, a digital video recorder, a digital video player, a device capable of transmitting/receiving information in a wireless environment, one of various electronic devices that constitute a home network, one of various electronic devices that constitute a computer network, one of various electronic devices that constitute a telematics network, an RFID device, or one of various components that constitute a computing system.

In an embodiment, the semiconductor memory device 1300 or the memory system 1000 may be packaged in any of various forms. For example, the semiconductor memory device 1300 or the memory system 1000 may be packaged in a manner, such as Package On Package (PoP), Ball Grid Arrays (BGAs), Chip Scale Packages (CSPs), Plastic Leaded Chip Carrier (PLCC), Plastic Dual In-line Package (PDIP), die in Waffle pack, die in wafer form, Chip On Board (COB), CERamic Dual In-line Package (CERDIP), plastic Metric Quad Flat Pack (MQFP), Thin Quad Flat Pack (TQFP), Small Outline Integrated Circuit (SOIC), Shrink Small Outline Package (SSOP), Thin Small Outline Package (TSOP), System In Package (SIP), Multi-Chip Package (MCP), Wafer-level Fabricated Package (WFP), or Wafer-level processed Stack Package (WSP).

Figure 19:
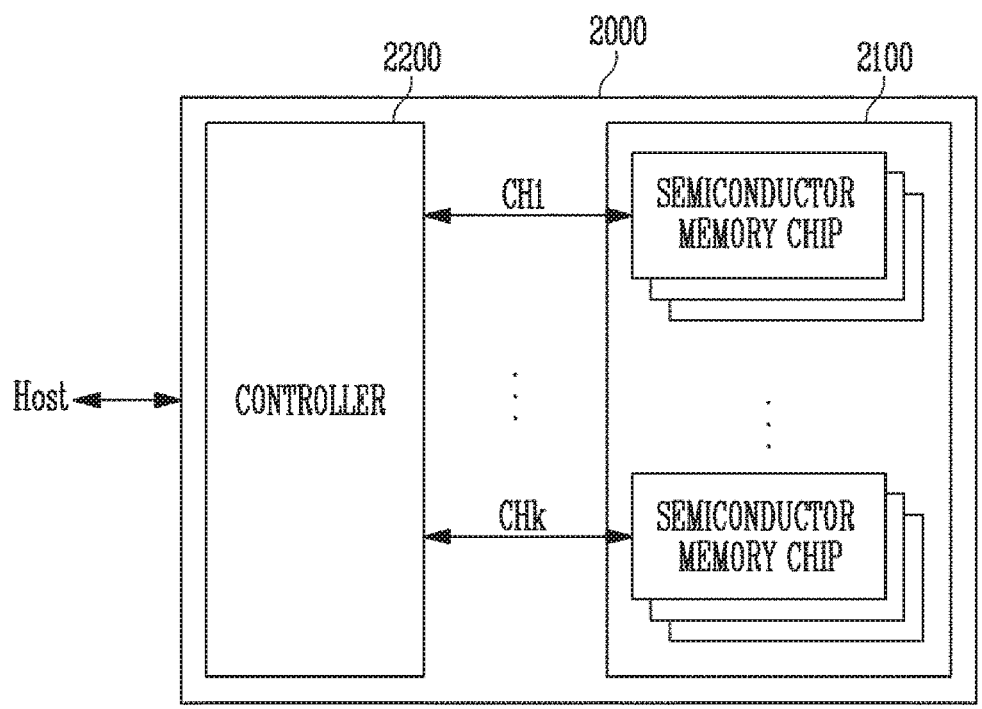
FIG. 19 is a block diagram illustrating an application example of the memory system shown in FIG. 18.

FIG. 19 is a block diagram illustrating an application example 2000 of the memory system shown in FIG. 18.

Referring to FIG. 19, the memory system 2000 includes a semiconductor memory device 2100 and a controller 2200. The semiconductor memory device 2100 includes a plurality of semiconductor memory chips. The plurality of semiconductor memory chips are divided into a plurality of groups, e.g., k groups.

FIG. 19 illustrates that the k groups communicate with the controller 2200 through first to kth channels CH1 to CHk respectively. Each semiconductor memory chip may be configured and operated identically to the semiconductor memory device 1300 described with reference to FIG. 18.

Each semiconductor memory chip of a particular group is configured to communicate with the controller 2200 through one common channel. The controller 2200 is configured identically to the controller 1200 described with reference to FIG. 18. The controller 2200 is configured to control the plurality of memory chips of the semiconductor memory device 2100 through the plurality of channels CH1 to CHk.

In FIG. 19, a case where a plurality of semiconductor memory chips are coupled to one channel is described. However, it will be understood that the memory system 2000 may be modified such that one semiconductor memory chip is coupled to one channel.

Figure 20:
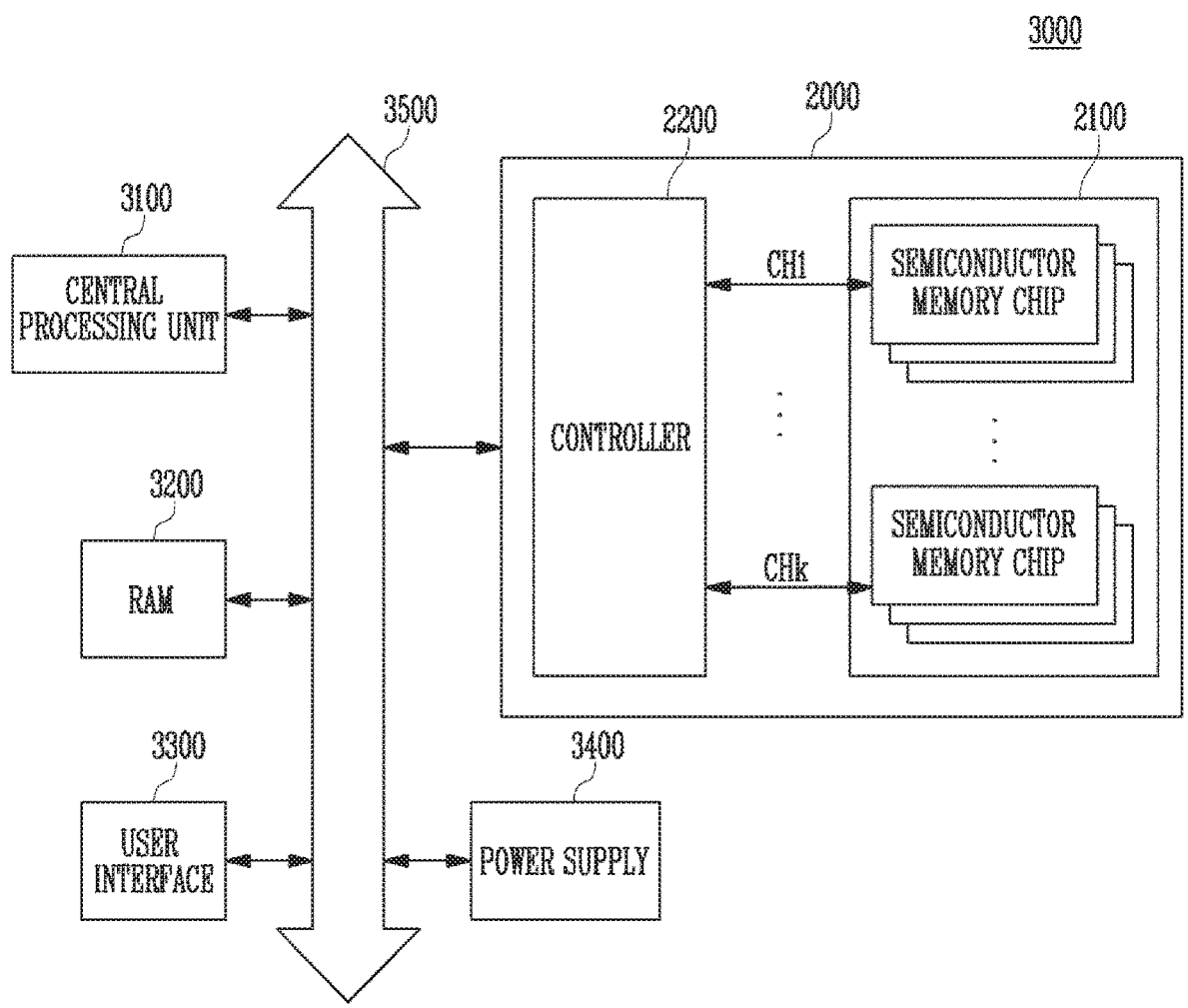
FIG. 20 is a block diagram illustrating an example of a computing system including the memory system shown in FIG. 19.

FIG. 20 is a block diagram illustrating a computing system 3000 including the memory system described with reference to FIG. 19.

Referring to FIG. 20, the computing system 3000 includes a central processing unit (CPU) 3100, a random access memory (RAM) 3200, a user interface 3300, a power supply 3400, a system bus 3500, and a memory system 2000.

The memory system 2000 is electrically coupled to the CPU 3100, the RAM 3200, the user interface 3300, and the power supply 3400 through the system bus 3500. Data supplied through user interface 3300 or data processed by the CPU 3100 are stored in the memory system 2000.

FIG. 20 illustrates that the semiconductor memory device 2100 is coupled to the system bus 3500 through the controller 2200. However, the semiconductor memory device 2100 may be directly coupled to the system bus 3500. The function of the controller 2200 may be performed by the CPU 3100 and the RAM 3200.

FIG. 20 illustrates the memory system 2000 described with reference to FIG. 19. However, the memory system 2000 may be replaced by the memory system 1000 described with reference to FIG. 18. In another embodiment, the computing system 3000 may be configured to include both of the memory systems 1000 and 2000 described with reference to FIGS. 18 and 19.

In accordance with the present disclosure, a controller may efficiently perform a garbage collection operation.

Further, in accordance with embodiments of the present disclosure, an operating method of a controller capable of efficiently performing a garbage collection operation is provided.

While the present disclosure has been shown and described with reference to certain embodiments thereof, it will be understood by those skilled in the art in light of the present disclosure that various changes in form and details may be made therein without departing from the spirit and scope of the present disclosure as defined by the appended claims and their equivalents. Therefore, the scope of the present disclosure should not be limited to the above-described exemplary embodiments but should be determined by not only the appended claims but also the equivalents thereof.

In the above-described embodiments, steps may be selectively performed or part of the steps may be omitted. In each embodiment, the steps are not necessarily performed in accordance with the described order and may be rearranged. The embodiments disclosed in this specification and drawings are only examples to facilitate an understanding of the present invention, not to limit it. That is, it should be apparent to those skilled in the art that various modifications can be made on the basis of the technological scope of the present disclosure.

Although specific terminologies are used here, they are only to explain the embodiments of the present disclosure. Therefore, the present invention is not restricted to the above-described embodiments and many variations are possible within the spirit and scope of the present disclosure. It should be apparent to those skilled in the art that various modifications can be made on the basis of the technological scope of the present disclosure in addition to the embodiments disclosed herein.

What is claimed is:

1. A controller for controlling an operation of a semiconductor memory device, the controller comprising:
    a request analyzer circuit configured to generate invalid data information, based on an erase request received from a host;
    a storage configured to store a garbage collection reference table representing memory blocks excluded from selection as a victim block on which a garbage collection operation is to be performed, based on the invalid data information; and
    a garbage collection controller configured to control the garbage collection operation on the semiconductor memory device, based on exclusion block information generated according to the garbage collection reference table,
    wherein the storage checks a size of data corresponding to the erase request, and determines that a memory block in which the data is stored is to be excluded from the selection as the victim block, when the size of the data is greater than a reference value.

2. The controller of claim 1, wherein the storage updates the garbage collection reference table such that the memory block is included in the garbage collection reference table.

3. The controller of claim 1, wherein the garbage collection controller:
    when the garbage collection operation is started, checks a size of each invalid page in memory blocks included in the semiconductor memory device; and
    determines, as the victim block, a memory block that is not registered in the garbage collection reference table, among memory blocks having an invalid page size greater than a threshold value, based on the exclusion block information.

4. The controller of claim 1, further comprising a command generator configured to generate commands for controlling an operation of the semiconductor memory device.

5. The controller of claim 4, wherein the garbage collection controller generates garbage collection information including information on selected victim blocks,
    wherein the command generator generates a command for performing the garbage collection operation, based on the garbage collection information, and transfers the generated command to the semiconductor memory device.

6. The controller of claim 4, wherein the request analyzer circuit generates a command generation control signal for controlling an operation of the semiconductor memory device in response to a request received from the host, and wherein the command generator generates a command corresponding to the request received from the host, based on the command generation control signal.

7. A method for operating a controller for controlling an operation of a semiconductor memory device, the method comprising:
- receiving an erase request from a host;
- invalidating a physical page of a memory block corresponding to the erase request; and
- updating a garbage collection reference table representing memory blocks excluded from selection as a victim block on which a garbage collection operation is to be performed, based on the erase request, wherein the updating of the garbage collection reference table includes:
- checking a size of the data corresponding to the erase request;
- comparing the size of the data with a reference value; and
- registering the memory block storing the data corresponding to the erase request in the garbage collection reference table, based on the comparison result.

8. The method of claim 7, wherein the registering of the memory block corresponding to the erase request in the garbage collection reference table, based on the comparison result, includes:
- when the comparison indicates that the size of the data is greater than the reference value, determining whether the memory block has been registered in the garbage collection reference table; and
- when it is determined that the memory block is not registered in the garbage collection reference table, registering the memory block in the garbage collection reference table.

9. The method of claim 7, wherein the updating of the garbage collection reference table includes:
- checking a logical block address of the data corresponding to the erase request;
- when it is determined that the logical block address represents consecutive addresses, determining whether the memory block has been registered in the garbage collection reference table; and
- when it is determined that the memory block is not registered in the garbage collection reference table, registering the memory block in the garbage collection reference table.

10. The method of claim 7, wherein the updating of the garbage collection reference table includes:
- checking a size and a logical block address of the data corresponding to the erase request;
- when it is determined that the logical block address represents consecutive addresses, comparing the size of the data with the reference value; and
- registering the memory block corresponding to the erase request in the garbage collection reference table, based on the comparison result.

11. The method of claim 10, wherein the registering of the memory block corresponding to the erase request in the garbage collection reference table, based on the comparison result, includes:
- when the comparison indicates that the size of the data is greater than the reference value, determining whether the memory block has been registered in the garbage collection reference table; and
- when it is determined that the memory block is not registered in the garbage collection reference table, registering the memory block in the garbage collection reference table.

\* \* \* \* \*